(12) United States Patent
Lin et al.

(10) Patent No.: US 12,089,080 B2
(45) Date of Patent: Sep. 10, 2024

(54) METHOD AND APPARATUS FOR PDCCH RELIABILITY ENHANCEMENTS

(71) Applicant: Samsung Electronics Co., Ltd., Suwon-si (KR)

(72) Inventors: Qiongjie Lin, Sunnyvale, CA (US); Aristides Papasakellariou, Houston, TX (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 35 days.

(21) Appl. No.: 17/653,268

(22) Filed: Mar. 2, 2022

(65) Prior Publication Data

US 2022/0295320 A1   Sep. 15, 2022

Related U.S. Application Data

(60) Provisional application No. 63/158,195, filed on Mar. 8, 2021.

(51) Int. Cl.
*H04W 24/08* (2009.01)
*H04L 1/1607* (2023.01)
(Continued)

(52) U.S. Cl.
CPC .......... *H04W 24/08* (2013.01); *H04L 1/1614* (2013.01); *H04L 1/1812* (2013.01);
(Continued)

(58) Field of Classification Search
CPC . H04W 24/08; H04W 72/0446; H04W 72/23; H04W 72/044; H04L 1/1614;
(Continued)

(56) References Cited

U.S. PATENT DOCUMENTS

2019/0222357 A1* 7/2019 Huang ................. H04L 5/0094
2019/0253308 A1* 8/2019 Huang ................ H04L 43/0823
(Continued)

OTHER PUBLICATIONS

"5G; NR; Physical channels and modulation (3GPP TS 38.211 version 16.4.0 Release 16)", ETSI TS 138 211 V16.4.0, Jan. 2021, 137 pages.

(Continued)

*Primary Examiner* — Charles C Jiang
*Assistant Examiner* — Ryan C Kavleski

(57) ABSTRACT

Methods and apparatus for physical downlink control channel (PDCCH) reliability enhancements. A method includes receiving first information for a number of N>1 search space sets. For each of the N search space sets, the first information includes: an index, wherein search space sets are indexed in an ascending order of respective indexes, a periodicity, wherein the periodicity is same for all of the N search space sets, and an indication that the N search space sets are linked for receptions of PDCCHs, wherein the PDCCHs provide identical information. The method further includes determining a number of N PDCCH reception occasions in M≥1 slots within a period according to the periodicity. A n-th PDCCH reception occasion from the N PDCCH reception occasions is according to a n-th search space set from the N search space sets. The method further includes receiving N PDCCHs in the N PDCCH reception occasions.

20 Claims, 19 Drawing Sheets

(51) Int. Cl.
*H04L 1/1812* (2023.01)
*H04L 5/00* (2006.01)
*H04W 72/0446* (2023.01)
*H04W 72/23* (2023.01)

(52) U.S. Cl.
CPC .......... *H04L 5/0051* (2013.01); *H04L 5/0053* (2013.01); *H04W 72/0446* (2013.01); *H04W 72/23* (2023.01)

(58) Field of Classification Search
CPC ... H04L 1/1812; H04L 5/0051; H04L 5/0053; H04L 5/0094; H04L 1/1861; H04L 1/1864; H04L 5/0055; H04L 1/189
See application file for complete search history.

(56) References Cited

U.S. PATENT DOCUMENTS

| | | | |
|---|---|---|---|
| 2019/0254110 A1* | 8/2019 | He | H04L 5/0048 |
| 2019/0297577 A1* | 9/2019 | Lin | H04W 52/0235 |
| 2020/0021474 A1 | 1/2020 | Papasakellariou | |
| 2020/0205138 A1 | 6/2020 | Nam et al. | |
| 2024/0089061 A1* | 3/2024 | Gao | H04L 5/0098 |
| 2024/0106609 A1* | 3/2024 | Zhang | H04W 72/232 |

OTHER PUBLICATIONS

"5G; NR; Multiplexing and channel coding (3GPP TS 38.212 version 16.4.0 Release 16)", ETSI TS 138 212 V16.4.0, Jan. 2021, 155 pages.
"5G; NR; Physical layer procedures for control (3GPP TS 38.213 version 16.4.0 Release 16)", ETSI TS 138 213 V16.4.0, Jan. 2021, 185 pages.
"5G; NR; Physical layer procedures for data (3GPP TS 38.214 version 16.4.0 Release 16)", ETSI TS 138 214 V16.4.0, Jan. 2021, 173 pages.
"5G; NR; Radio Resource Control (RRC); Protocol specification (3GPP TS 38.331 version 16.3.1 Release 16)", ETSI TS 138 331 V16.3.1, Jan. 2021, 916 pages.
"5G; NR; Medium Access Control (MAC) protocol specification (3GPP TS 38.321 version 16.3.0 Release 16)", ETSI TS 138 321 V16.3.0, Jan. 2021, 158 pages.
International Search Report and Written Opinion issued Jun. 23, 2022 regarding International Application No. PCT/KR2022/003246, 6 pages.
CATT, "Enhancements on multi-TRP/panel for PDCCH, PUCCH and PUSCH", 3GPP TSG RAN WG1 Meeting #104-e, R1-2100344, Jan. 2021, 17 pages.
Fraunhofer Iis, et al., "On multi-TRP enhancements for PDCCH and PUSCH", 3GPP TSG RAN WG1 Meeting #104-e, R1-2100535, Jan. 2021, 13 pages.
ZTE, "Enhancements on Multi-TRP for PDCCH, PUCCH and PUSCH", 3GPP TSG RAN WG1 Meeting #104-e, R1-2100286, Jan. 2021, 25 pages.
Extended European Search Report issued Jul. 30, 2024 regarding Application No. 22767464.5, 11 pages.
Qualcomm Incorporated, "Summary #1 of email discussion [102-e-NR-feMIIVIO-02]", 3GPP TSG RAN WG1 Meeting #102-e, R1-2007180, Aug. 2020, 63 pages.
Lenovo et al., "Enhancements on Multi-TRP for PDCCH, PUCCH and PUSCH", 3GPP TSG RAN WG1 #103-e, R1-2008911, Oct. 2020, 15 pages.
VIVO, "Enhancements on Multi-TRP for PDCCH, PUCCH and PUSCH", 3GPP TSG RAN WG1 #104-e, R1-2100422, Jan. 2021, 28 pages.

* cited by examiner

METHOD AND APPARATUS FOR PDCCH RELIABILITY ENHANCEMENTS

CROSS-REFERENCE TO RELATED APPLICATION AND CLAIM OF PRIORITY

This application claims priority under 35 U.S.C. § 119(e) to U.S. Provisional Patent Application No. 63/158,195 filed on Mar. 8, 2021. The above-identified provisional patent applications are hereby incorporated by reference in their entirety.

TECHNICAL FIELD

The present disclosure relates generally to wireless communication systems and, more specifically, the present disclosure relates to method and apparatus for physical downlink control channel (PDCCH) reliability enhancements.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to method and apparatus for PDCCH reliability enhancements.

In one embodiment, a user equipment (UE) is provided. The UE includes a transceiver configured to receive first information for a number of N>1 search space sets. For each of the N search space sets, the first information includes: an index, wherein search space sets are indexed in an ascending order of respective indexes, a periodicity, wherein the periodicity is same for all of the N search space sets, and an indication that the N search space sets are linked for receptions of PDCCHs, wherein the PDCCHs provide identical information. The UE further includes a processor operably coupled to the transceiver. The processor is configured to determine a number of N PDCCH reception occasions in $M \geq 1$ slots within a period according to the periodicity. A n-th PDCCH reception occasion from the N PDCCH reception occasions is according to a n-th search space set from the N search space sets ($1 \leq n \leq N$). The transceiver is further configured to receive N PDCCHs in the N PDCCH reception occasions.

In another embodiment, a base station (BS) is provided. The BS includes a transceiver configured to transmit first information for a number of N>1 search space sets. For each of the N search space sets, the first information includes: an index, wherein search space sets are indexed in an ascending order of respective indexes, a periodicity, wherein the periodicity is same for all of the N search space sets, and an indication that the N search space sets are linked for transmissions of PDCCHs, wherein the PDCCHs provide identical information. The BS further includes a processor operably coupled to the transceiver. The processor is configured to determine a number of N PDCCH transmission occasions in $M \geq 1$ slots within a period according to the periodicity. A n-th PDCCH transmission occasion from the N PDCCH transmission occasions is according to a n-th search space set from the N search space sets. The transceiver is further configured to transmit N PDCCHs in the N PDCCH transmission occasions.

In yet another embodiment, a method is provided. The method includes receiving first information for a number of N>1 search space sets. For each of the N search space sets, the first information includes: an index, wherein search space sets are indexed in an ascending order of respective indexes, a periodicity, wherein the periodicity is same for all of the N search space sets, and an indication that the N search space sets are linked for receptions of PDCCHs, wherein the PDCCHs provide identical information. The method further includes determining a number of N PDCCH reception occasions in $M \geq 1$ slots within a period according to the periodicity. A n-th PDCCH reception occasion from the N PDCCH reception occasions is according to a n-th search space set from the N search space sets. The method further includes receiving N PDCCHs in the N PDCCH reception occasions.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
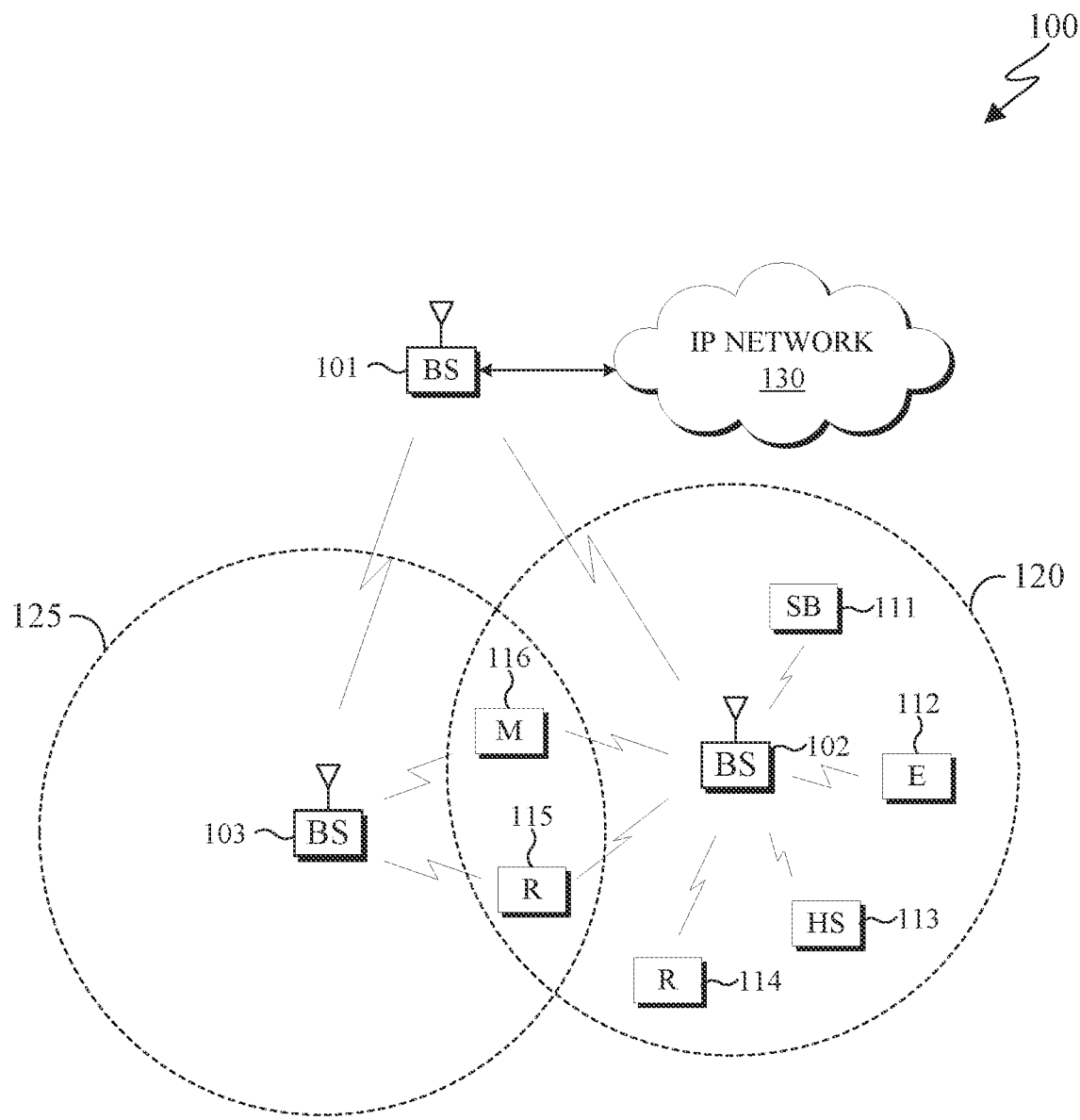
FIG. 1 illustrates an example wireless network according to embodiments of the present disclosure.

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.4.0, "NR; Physical channels and modulation" ("REF1"); 3GPP TS 38.212 v16.4.0, "NR; Multiplexing and channel coding" ("REF2"); 3GPP TS 38.213 v16.4.0, "NR; Physical layer procedures for control" ("REF3"); 3GPP TS 38.214 v16.4.0, "NR; Physical layer procedures for data" ("REF4"); 3GPP TS 38.331 v16.3.1, "NR; Radio Resource Control (RRC) protocol specification" ("REF5"); and 3GPP TS 38.321 v16.3.0, "NR; Medium Access Control (MAC).protocol specification" ("REF6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' 'gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
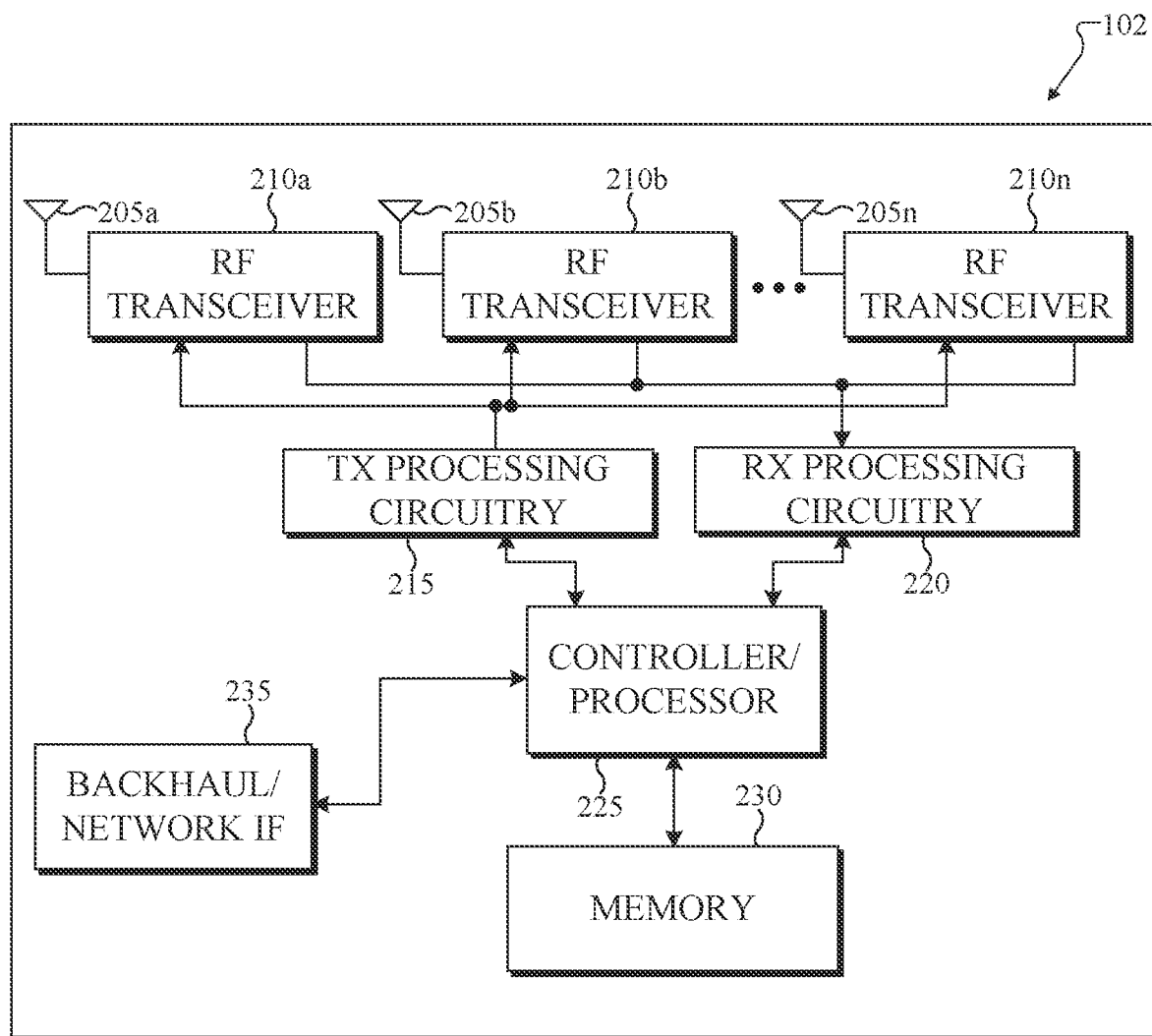
FIG. 2 illustrates an example BS according to embodiments of the present disclosure.
Figure 3:
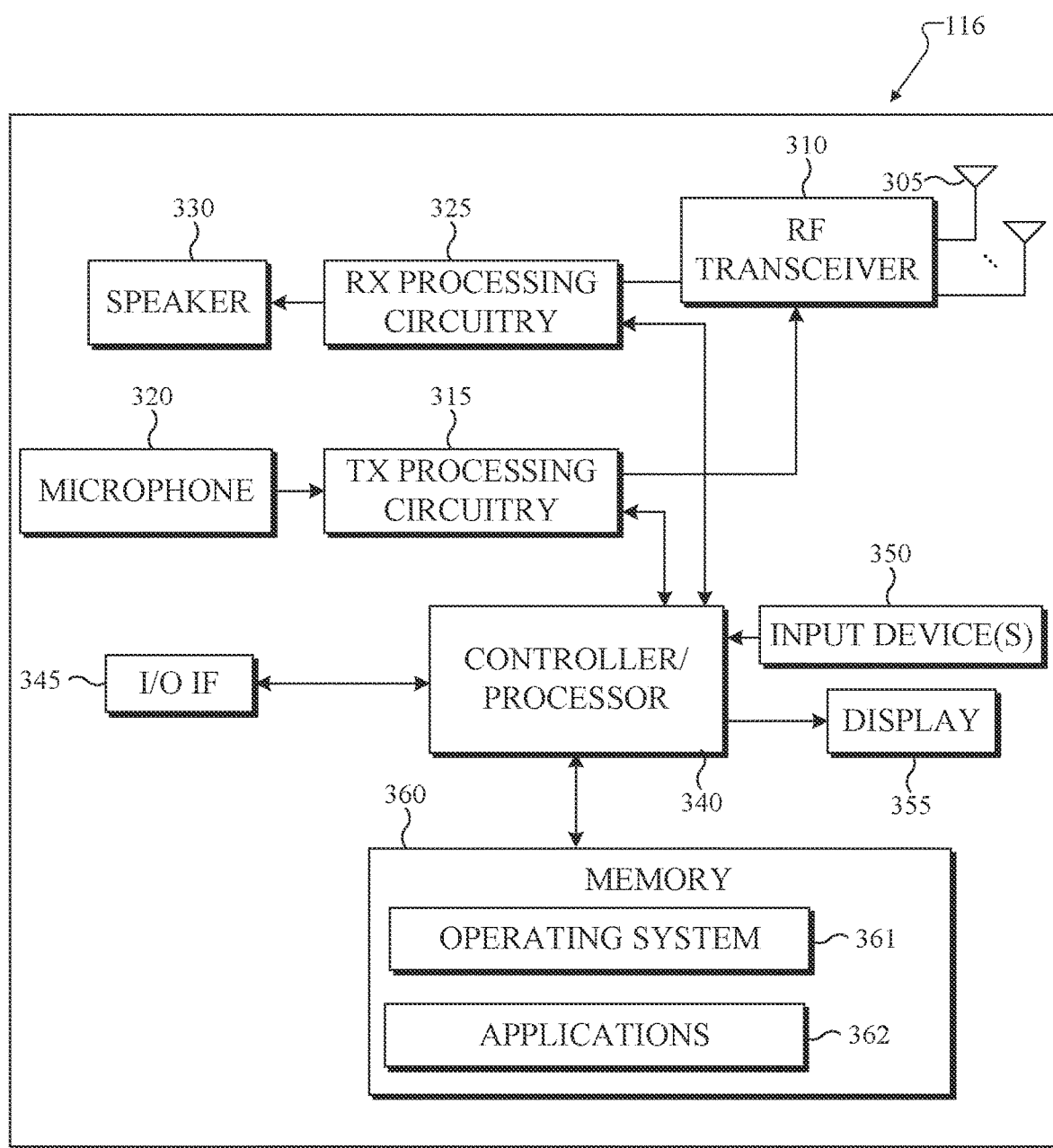
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for PDCCH reliability enhancements. In certain embodiments, and one or more of the BSs 101-103 includes circuitry, programing, or a combination thereof for PDCCH reliability enhancements.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support PDCCH reliability enhancements. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports communication between entities, such as web real time communications (RTC). For example, the controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

As described in more detail below, the transmit and receive paths of a BS, such as the BS 102 (implemented using the RF transceivers 210a-210n, TX processing circuitry 215, and/or RX processing circuitry 220) support communication with aggregation of frequency division duplexing (FDD) cells and time division duplexing (TDD) cells.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
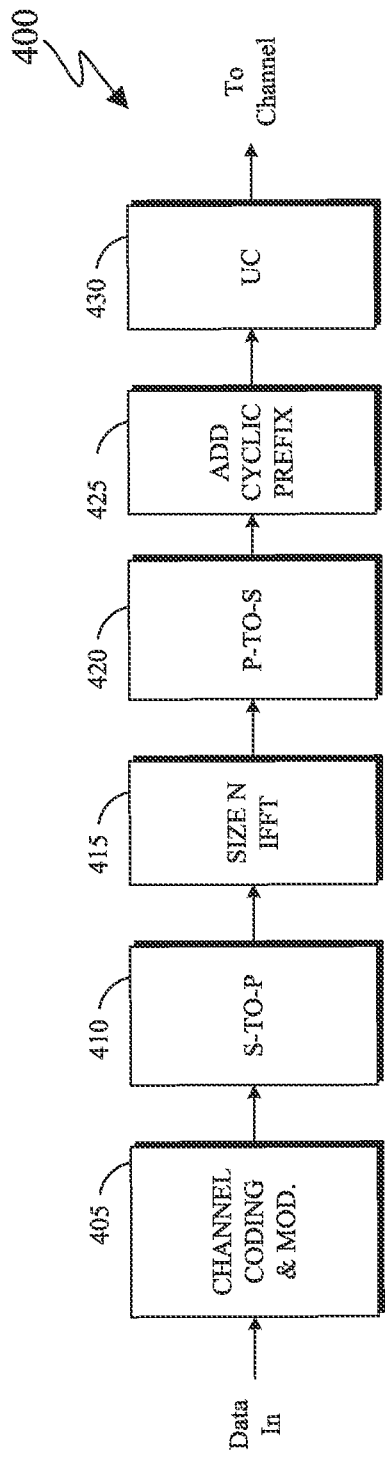
FIGS. 4 and 5 illustrate example wireless transmit and receive paths according to embodiments of the present disclosure.
Figure 5:
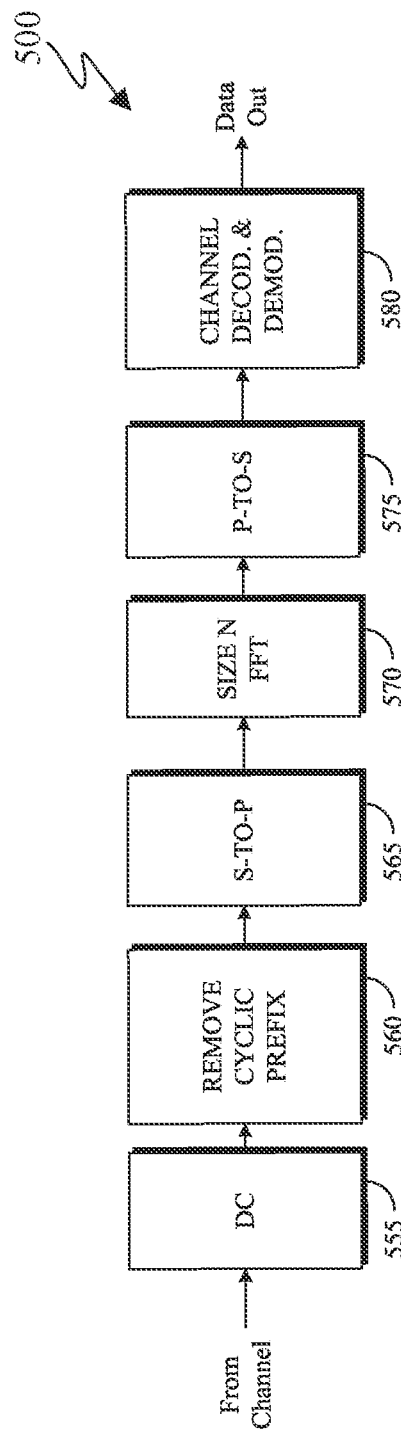

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support PDCCH reliability enhancements as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

For network deployments in frequency bands between 52.6 GHz and 71 GHz, a large sub-carrier spacing (SCS) value, such as 480 kHz or 960 kHz can be used to overcome phase noise and maintain a same FFT size as for operation in lower frequency bands. Using a same framework of control-resource set (CORESET) configuration for frequency bands between 52.6 GHz and 71 GHz as in lower frequency bands will result to a significant coverage loss for PDCCH receptions due to a larger path loss and a smaller symbol duration in case of larger SCS value where, for example, for a PDCCH transmission over a same number of symbols, there is a 9 dB loss for an SCS of 960 kHz relative to an SCS of 120 kHz.

A network deployment can also support UEs with reduced capabilities (RedCap UEs). A RedCap UE can have a reduced capability for a maximum transmission/reception bandwidth or for a number of receiver antennas than a non-RedCap UE. A RedCap UE can therefore be configured with reduced maximum reception bandwidth and use a reduced maximum number of Rx antenna branches, thereby resulting to additional coverage loss. For example, a coverage loss for PDCCH can be ~6-10 dB when a number of Rx antennas is reduced from four to one, and ~3-6 dB when a number of Rx antennas is reduced from four to two or from two to one.

A PDCCH includes of a number of control-channel elements (CCEs) in a CORESET. A CCE includes six resource element groups (REG). A REG includes a resource block (RB) over an OFDM symbol. In order to improve coverage for a target PDCCH reception reliability, one approach is to transmit a PDCCH with repetitions. However, this can increase a PDCCH reception complexity by the UE for combining repetitions and may require additional signaling to avoid an ambiguity between an actual number of PDCCH repetitions and an estimated number by the UE. Another approach is to extend a REG unit from one symbol into multiple symbols to enable reuse of an existing PDCCH allocation framework. A PDCCH transmission includes a dedicated demodulation (DM) reference signals (RS) that occupies one subcarrier (SC) every four SCs (or 18 SCs from a REG of 72 SCs) in each symbol used for the PDCCH transmission. However, for large SCS values, the channel medium varies more in the frequency domain than in the time domain compared to smaller SCS values for a same number of SCs per REG and a same number of CORESET symbols. Therefore, it is beneficial to use a different DM-RS structure for a PDCCH transmission with large SCS than a DM-RS structure for a PDCCH transmission with small SCS by allocating more resource elements (REs) to DM-RS in the frequency domain and less REs to DM-RS in the time domain.

Therefore, embodiments of the present disclosure take into consideration that there is a need to extend a REG over multiple OFDM symbols in order to enhance a PDCCH coverage for a target reception reliability.

Embodiments of the present disclosure also take into consideration that there is a need to determine a procedure for PDCCH repetitions in order to enhance a PDCCH coverage for a target reception reliability.

Embodiments of the present disclosure further take into consideration that there is a need to use different DM-RS structures for a PDCCH transmission depending on an SCS of the PDCCH transmission.

Accordingly, embodiments of the present disclosure describe enhanced REG in CORESET. This is described in the following examples and embodiments, such as those of FIGS. 6-8.

Figure 6:
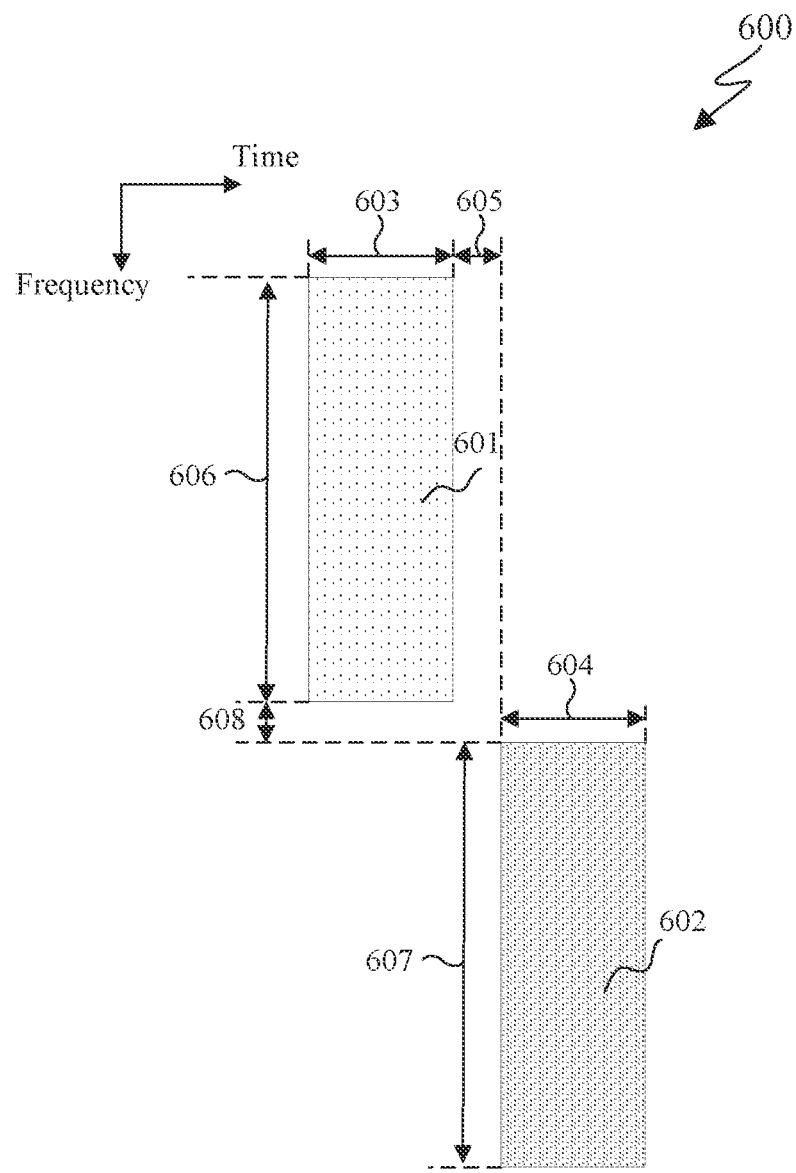
FIG. 6 illustrates an example diagram of a control resource set (CORESET) configuration according to embodiments of the present disclosure.
Figure 7A:
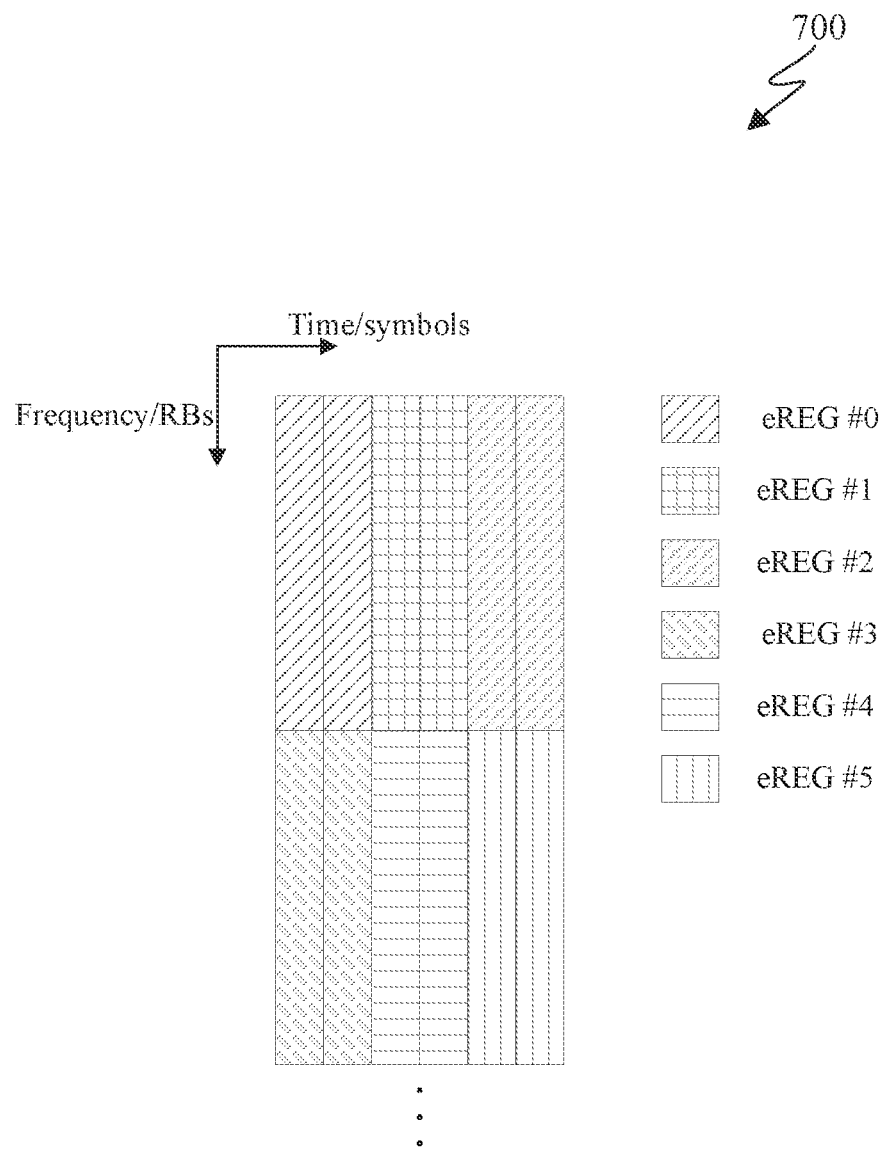
FIGS. 7A and 7B illustrate example diagrams of enhanced resource element group (eREG) structures according to embodiments of the present disclosure.
Figure 7B:
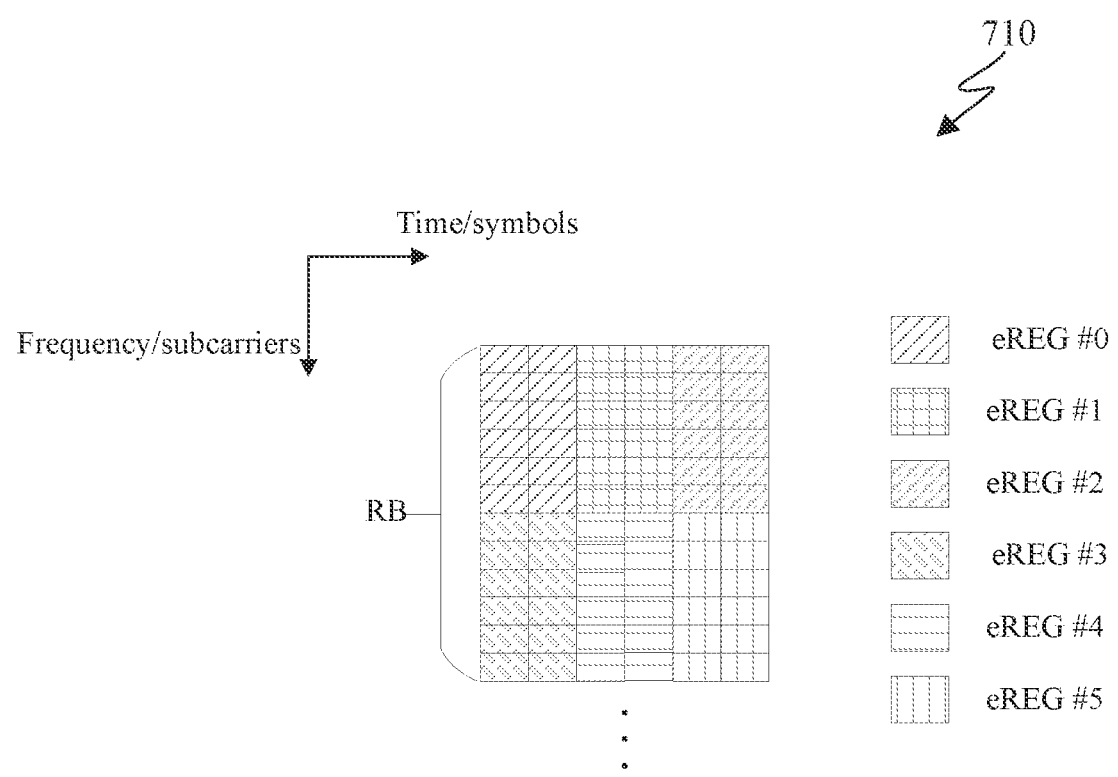
Figure 8:
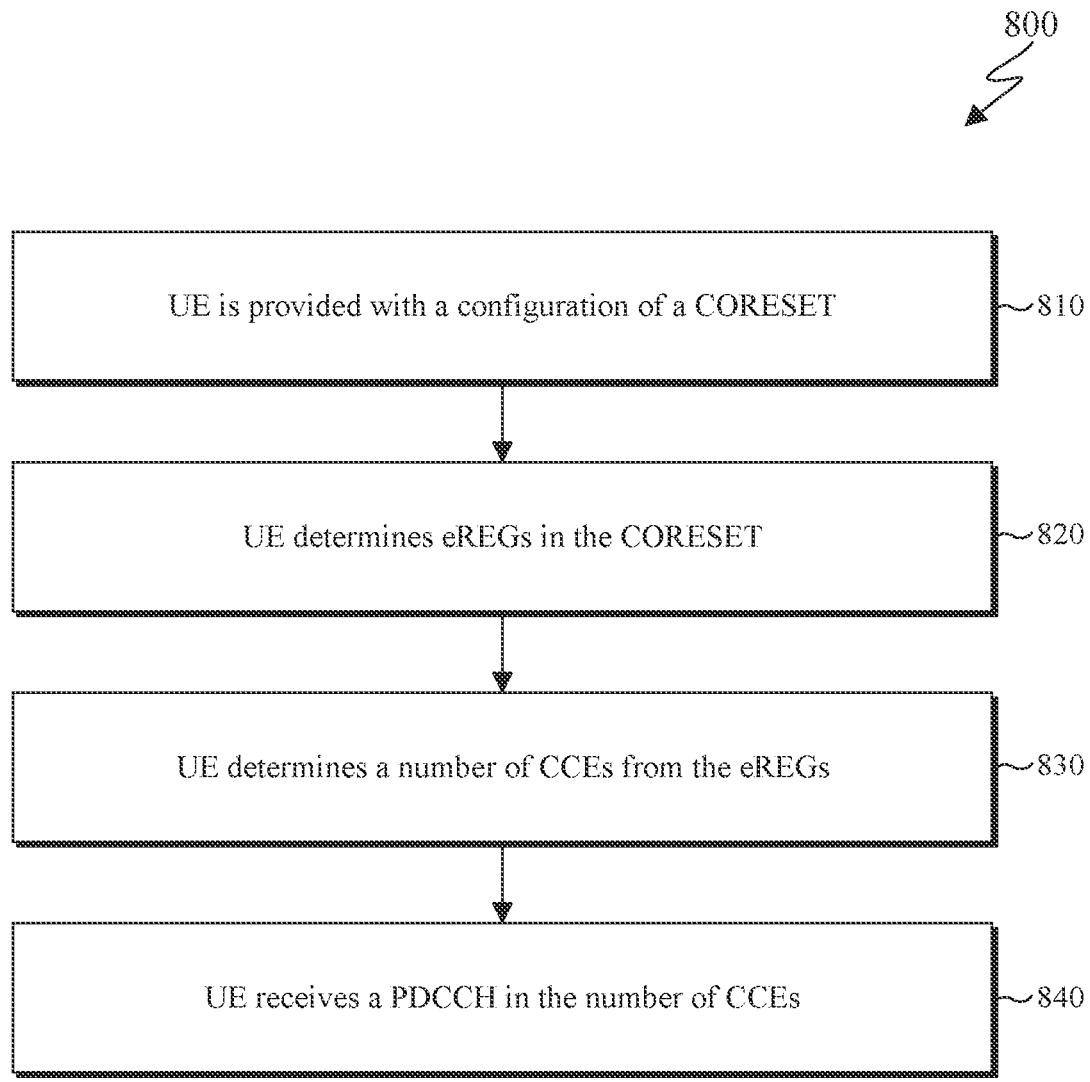
FIG. 8 illustrates an example method for receiving eREG based on PDCCHs according to embodiments of the present disclosure.

FIG. 6 illustrates an example diagram 600 of a CORESET configuration according to embodiments of the present disclosure. FIGS. 7A and 7B illustrate example diagrams 700 and 710, respectively, of enhanced REG (eREG) structures according to embodiments of the present disclosure. FIG. 8 illustrates an example method 800 for receiving eREG based on PDCCHs according to embodiments of the present disclosure.

The steps of the method 800 of FIG. 8 can be performed by any of the UEs 111-116 of FIG. 1, such as the UE 116 of FIG. 3. The diagrams 600 and 700 as well as the method 800 are for illustration only and other embodiments can be used without departing from the scope of the present disclosure.

Certain embodiments of this disclosure consider extensions to a REG. In order to improve coverage of PDCCH transmissions, a REG can be extended from one OFDM symbol to $N_{symb}^{eREG}>1$ or $N_{symb}^{eREG}>3$ OFDM symbols. The $N_{symb}^{eREG}$ can be consecutive or non-consecutive in time although a consecutive number of symbols is expected to be typically applicable in practice. An eREG can be used for PDCCH receptions associated with specific SCS. For example, SCS of 480 kHz or 960 kHz. For example, in addition to a the {time, frequency} REG structures of {1 symbol, 6 RBs}, {2 symbols, 3 RBs}, and {3 symbols, 2 RBs}, the REG structure of {6 symbols, 1 RB} can be introduced and a corresponding CORESET can then be extended to 6 symbols.

A UE (such as the UE 116) can be provided a CORESET that consists of $N_{RB}^{CORESET}$ RBs in the frequency domain and $N_{symb}^{CORESET}$ OFDM symbols in the time domain. The CORESET duration $N_{symb}^{CORESET}$ is a multiple of $N_{symb}^{eREG}$, such that $N_{symb}^{CORESET}=k \cdot N_{symb}^{eREG}$, where k is positive integer. For example to determine $N_{symb}^{CORESET}$, the UE can be provided with an applicable value for $N_{symb}^{CORESET}$ explicitly either in the configuration of the CORESET or predefined in the specification of the system operation, such as $N_{symb}^{CORESET}=6$. For another example, to determine $N_{symb}^{CORESET}$ the UE can be provided with k and $N_{symb}^{eREG}$, for example in the configuration of the CORESET by higher layers or in the specification of the system operation, and the UE derives $N_{symb}^{CORESET}$ based on k and $N_{symb}^{eREG}$, such that $N_{symb}^{CORESET}=k \cdot N_{symb}^{eREG}$. For example, candidate values for k can be 1, 2, or 3. For example, $N_{symb}^{eREG}=2$.

For time and frequency domain resource allocation of a CORESET, the CORESET can be allocated with a number of $N_{RB}^{CORESET}$ continuous RBs over $N_{symb}^{CORESET}$ consecutive symbols. Alternatively, the CORESET can be allocated over non-continuous RBs or non-consecutive symbols. The allocated REs for the CORESET can be divided into K>1 sets of REs, where each set of REs are allocated with non-overlapped RBs and symbols. For example, the (k+1)th (k=0, ..., K−1) set of REs for the CORESET are allocated with $N_{RBs}^{set}$ continuous RBs with first RB, described in Equation (1), and $N_{symbs}^{set}$ consecutive OFDM symbols with first symbol index, described in Equation (2).

$$n_k^{firstRB} = n_0^{firstRB} + k \cdot N_{RBs}^{gap} \quad (1)$$

$$n_k^{firstSymb} = n_0^{firstSymbol} + k \cdot N_{symbs}^{gap} \quad (2)$$

It is noted that in Equations (1) and (2) $n_0^{firstRB}$ and $n_0^{firstSymbol}$ are the first RB index and first symbol index for the first set of REs, respectively. Additionally, in Equations (1) and (2), $N_{RBs}^{gap}$ is the RB offset between the first RB of two consecutive sets of REs, and $N_{symbs}^{gap}$ is the symbol offset between the first symbol of two consecutive sets of REs. Additionally, in Equations (1) and (2), $n_0^{firstRB}$ or $n_0^{firstSymbol}$ be provided to the UE in the configuration of the CORESET. Additionally, in Equations (1) and (2), $N_{RBs}^{gap}$ can be either provided in the configuration of the CORESET or be determined based on $N_{RBs}^{CORESET}$, such as described in Equation (3), below. In Equation (3), a is a non-negative integer, and indicates the RB gap between the end of the last RB from kth set of REs and the beginning of the first RB of the (k+1)th set of REs, for example a=0.

$$N_{RBs}^{gap} = \frac{N_{RB}^{CORESET}}{K} + a \quad (3)$$

Additionally, in Equations (1) and (2), $N_{symbs}^{gap}$ can be either provided in the configuration of the CORESET or be determined based on $N_{symb}^{CORESET}$, as described in Equation (4), below. In Equation (4), b is a positive constant and b indicates a time offset between the end of the last symbol from the kth set of REs and the beginning of the first symbol of the (k+1)th set of REs, for example b=1.

$$N_{symbs}^{gap} = \frac{N_{symb}^{CORESET}}{K} + b \quad (4)$$

The CORESET consists of K sets of REs can be associated with N>=1 TCI states, wherein N<=K. In one approach to determine the associated TCI state for a set of REs, the (k+1)th (k=0, ..., K−1) set of REs can be associated with (mod(k, N)+1)th TCI state from the N TCI states. In another approach to determine the associated TCI state for a set of REs, a number of consecutive sets of REs are associated with a TCI state from the N>=1 TCI state. For example, the (k+1)th (k=0, ..., K−1) set of REs can be associated with $$(\left\lfloor \frac{k+1}{N} \right\rfloor)th$$

TCI state from the N TCI states.

The diagram 600 as illustrated in FIG. 6 describes an example of CORESET configuration.

A UE (such as the UE 116) is configured with a CORESET with number of $N_{RB}^{CORESET}$ non-continuous RBs and number of $N_{symb}^{CORESET}=6$ non-consecutive OFDM symbols. The REs of the CORESET can be divided into a first set of REs, 601, and a second set of REs, 603. In this example, the first set of REs occupies $N_{RB}^{CORESET}/2$ RBs, 606, during three consecutive symbols, 603. The second set of REs occupies another $N_{RB}^{CORESET}/2$ RBs, 607, during another three consecutive symbols, 604.

As illustrated, there is a gap of one symbol between the end of the last symbol from the first set of REs and the beginning of the first symbol of the second set of REs, 605. There is an RB gap between the end of the last RB from the first set of REs and the beginning of the first RB of the second set of REs, 608.

In a first approach, an eREG is equal to one RB during a number of $N_{symb}^{eREG}$ OFDM symbols. Additionally, eREGs within a CORESET are numbered in increasing order in a time-first manner, starting with 0 for the first $N_{symb}^{eREG}$ OFDM symbols and the lowest-numbered RB in the CORESET.

The diagram 700 as illustrated in FIG. 7A describes a first example of an eREG structure.

As illustrated in the diagram 700, an eREG is 1 RB during 2 consecutive OFDM symbols in a CORESET. The CORESET has 6 symbols. eREGs within the CORESET are numbered in increasing order in a time-first manner, starting with 0 for the first 2 OFDM symbols and the lowest-numbered RB in the CORESET.

In a second approach, an eREG is equal to a number of continuous $N_{sc}^{eREG}$ SCs within an RB in the frequency domain and a number of $N_{symb}^{eREG}$ OFDM symbols in the time domain. $N_{symb}^{eREG} \geq 1$. $1 \leq N_{sc}^{eREG} \leq N_{sc}^{RB}$, where $N_{sc}^{RB}$ is number of subcarriers per RB. eREGs within a CORESET are numbered in increasing order in a time-first manner, starting with 0 for the first $N_{symb}^{eREG}$ OFDM symbols and the first $N_{sc}^{eREG}$ subcarriers in the lowest-numbered RB in the CORESET.

The diagram 710 as illustrated in FIG. 7B describes a second example of an eREG structure.

As illustrated in the diagram 710, an eREG is 6 continuous SCs during 2 consecutive OFDM symbols in a CORESET. The CORESET has 6 symbols. eREGs within the CORESET are numbered in increasing order in a time-first manner, starting with 0 for the first 2 OFDM symbols and the first 6 subcarriers in the lowest-numbered RB in the CORESET.

In certain embodiments, a UE (such as the UE 116) can be configured for multiple CORESETs. Each CORESET is associated with one CCE-to-eREG mapping. The CCE-to-eREG mapping for a CORESET can be interleaved or non-interleaved based on eREG bundles.

An eREG bundle with index i is defined as eREGs {i·L, i·L+1, ..., i·L+L−1}, where L is the eREG bundle size, i=0, 1, ..., $$\frac{N_{REG}^{CORESET}}{L} - 1,$$

and $N_{REG}^{CORESET}$ is the number of REGs in the CORESET. The first approach based eREG, is described in Equation (5). The second approach based on eREG is described in Equation (5), below.

$$N_{REG}^{CORESET} = \frac{N_{RB}^{CORESET}}{(N_{sc}^{RB}/N_{sc}^{eREG})} \cdot \frac{N_{symb}^{CORESET}}{N_{symb}^{eREG}} \quad (5)$$

$$N_{REG}^{CORESET} = N_{RB}^{CORESET} \cdot \frac{N_{symb}^{CORESET}}{N_{symb}^{eREG}} \quad (6)$$

A CCE consists of 6 eREGs. A CCE with index j consists of eREG bundles $\{f(6j/L),$ $$f(\frac{6j}{L}+1), \ldots, f(\frac{6j}{L}+\frac{6}{L}-1)\},$$

where f(•) is an interleaver.

For non-interleaved CCE-to-eREG mapping, L=6 and f(x)=X.

For interleaved CCE-to-eREG mapping, L∈{2, 6} for $N_{symb}^{CORESET} \in \{N_{symb}^{eREG}\}$, $$L \in \{\frac{N_{symb}^{CORESET}}{N_{symb}^{eREG}}, 6\}$$

for $N_{symb}^{CORESET} \in \{2 \cdot N_{symb}^{eREG}, 3 \cdot N_{symb}^{eREG}\}$. L∈{6} for $N_{symb}^{CORESET} \in \{6 \cdot N_{symb}^{eREG}\}$. The interleaver is described in Equation (7). The elements of Equation (7) are described in Equations (8)-(11). It is noted that, R∈{2,3,6}.

$$f(x) = (rC + c + n_{shift}) \mod \left(\frac{N_{REG}^{CORESET}}{L}\right) \quad (7)$$

$$x = cR + r \quad (8)$$

$$r = 0, 1, \ldots, R-1 \quad (9)$$

$$c = 0, 1, \ldots, C-1 \quad (10)$$

$$C = N_{REG}^{CORESET}/(LR) \quad (11)$$

A UE can be provided with any of the following higher layer parameters. A parameter, L is for interleaved mapping. A UE can be provided with a CCE-to-eREG mapping type to indicate interleaved or non-interleaved CCE-to-eREG mapping. A UE can also be provided with an interleaver size, R. A UE can also be provided with Shift index, $n_{shift}$. If not provided, the UE assumes $n_{shift}$ equals the identity of serving cell.

For determining a precoding for eREGs, one of the following can apply and a UE can be provided a corresponding indication by higher layers. For example, a same precoding within a REG bundle. For another example, A same precoding across all REGs within the set of continuous RBs in the CORESET.

For CORESET 0 configured by a ControlResourceSetZero IE, a UE can assume the following: (i) Interleaved CCE-to-eREG mapping; (ii) L=6; (iii) R=2; (iv) $n_{shift}$ equals the identity of serving cell; (v) same precoding within a eREG bundle; and (vi) applicable values for $N_{symb}^{CORESET}$ and/or $N_{RB}^{CORESET}$ and/or $N_{symb}^{eREG}$.

Applicable values for $N_{symb}^{CORESET}$ and/or $N_{RB}^{CORESET}$ and/or $N_{symb}^{eREG}$ and/or $N_{sc}^{eREG}$ for CORESET 0 can be jointly defined based on a predetermined table, where each row of the table provides applicable values for $N_{symb}^{CORESET}$ and/or $N_{RB}^{CORESET}$ and/or $N_{symb}^{eREG}$ and/or $N_{sc}^{eREG}$.

Table 1, below, provides an example of a table for determining $N_{RB}^{CORESET}$, $N_{symb}^{CORESET}$ and $N_{symb}^{eREG}$ based on the first example of an eREG structure.

Although FIG. 6 illustrates the diagram 600, FIG. 7A illustrates the diagram 700, FIG. 7B illustrates the diagram 710, and FIG. 8 illustrates the method 800 various changes may be made to FIGS. 6-8. For example, while the method 800 is shown as a series of steps, various steps could overlap, occur in parallel, occur in a different order, or occur multiple times. In another example, steps may be omitted or replaced by other steps. For example, steps of the method 800 can be executed in a different order.

TABLE 1

| Index | Synchronized signal/physical broadcast channel (SS/PBCH) block and CORESET multiplexing pattern | Number of RBs $N_{RB}^{CORESET}$ | Number of Symbols $N_{symb}^{CORESET}$ | Number of symbols per REG, $N_{symb}^{eREG}$ | Offset (RBs) |
|---|---|---|---|---|---|
| 0 | 1 | 24 | 4 | 2 | 0 |
| 1 | 1 | 24 | 4 | 2 | 2 |
| 2 | 1 | 24 | 4 | 2 | 4 |
| 3 | 1 | 24 | 6 | 2 | 0 |
| 4 | 1 | 24 | 6 | 2 | 2 |
| 5 | 1 | 24 | 6 | 2 | 4 |
| 6 | 1 | 48 | 2 | 2 | 12 |
| 7 | 1 | 48 | 2 | 2 | 16 |
| 8 | 1 | 48 | 4 | 2 | 12 |
| 9 | 1 | 48 | 4 | 2 | 16 |
| 10 | 1 | 48 | 6 | 2 | 12 |
| 11 | 1 | 48 | 6 | 2 | 16 |
| 12 | 1 | 96 | 2 | 2 | 38 |
| 13 | 1 | 96 | 4 | 2 | 38 |
| 14 | 1 | 96 | 6 | 2 | 38 |
| 15 | Reserved | | | | |

Table 2, below, is an example of the table for determining $N_{RB}^{CORESET}$, $N_{sc}^{eREG}$, $N_{symb}^{CORESET}$ and $N_{symb}^{eREG}$ based on the second approach of eREG.

Embodiments of the present disclosure describe PDCCH repetitions. This is described in the following examples and embodiments, such as those of FIGS. 9A-12.

TABLE 2

| Index | SS/PBCH block and CORESET multiplexing pattern | Number of RBs $N_{RB}^{CORESET}$ | Number of SCs per eREG $N_{sc}^{eREG}$ | Number of Symbols $N_{symb}^{CORESET}$ | Number of symbols per REG, $N_{symb}^{eREG}$ | Offset (RBs) |
|---|---|---|---|---|---|---|
| 0 | 1 | 12 | 6 | 4 | 2 | 0 |
| 1 | 1 | 12 | 6 | 4 | 2 | 1 |
| 2 | 1 | 12 | 6 | 4 | 2 | 2 |
| 3 | 1 | 12 | 6 | 6 | 2 | 0 |
| 4 | 1 | 12 | 6 | 6 | 2 | 1 |
| 5 | 1 | 12 | 6 | 6 | 2 | 2 |
| 6 | 1 | 24 | 6 | 2 | 2 | 6 |
| 7 | 1 | 24 | 6 | 2 | 2 | 8 |
| 8 | 1 | 24 | 6 | 4 | 2 | 6 |
| 9 | 1 | 24 | 6 | 4 | 2 | 8 |
| 10 | 1 | 24 | 6 | 6 | 2 | 6 |
| 11 | 1 | 24 | 6 | 6 | 2 | 8 |
| 12 | 1 | 48 | 6 | 2 | 2 | 19 |
| 13 | 1 | 48 | 6 | 4 | 2 | 19 |
| 14 | 1 | 48 | 6 | 6 | 2 | 19 |
| 15 | Reserved | | | | | |

The method 800 as illustrated in FIG. 8 is an example procedure for a UE receiving eREG-based PDCCHs.

In step 810, a UE (such as the UE 116) is provided a configuration of a CORESET. In step 820, the UE determines eREGs in the CORESET based on the configuration. In step 830, the UE determines a number of CCEs from the eREGs. In step 840, the UE receive a PDCCH in the number of CCEs according to a corresponding search space set configuration.

Figure 9A:
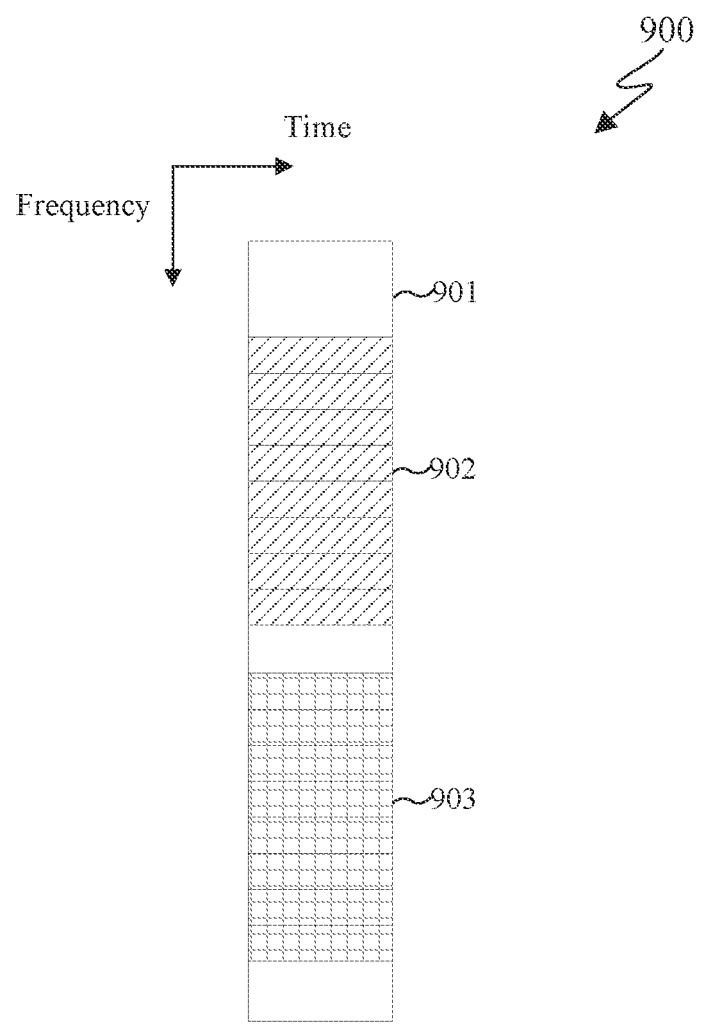
FIGS. 9A, 9B, and 9C illustrate example diagrams of frequency division multiplexing (FDM) for a number of PDCCH repetitions according to embodiments of the present disclosure.
Figure 9B:
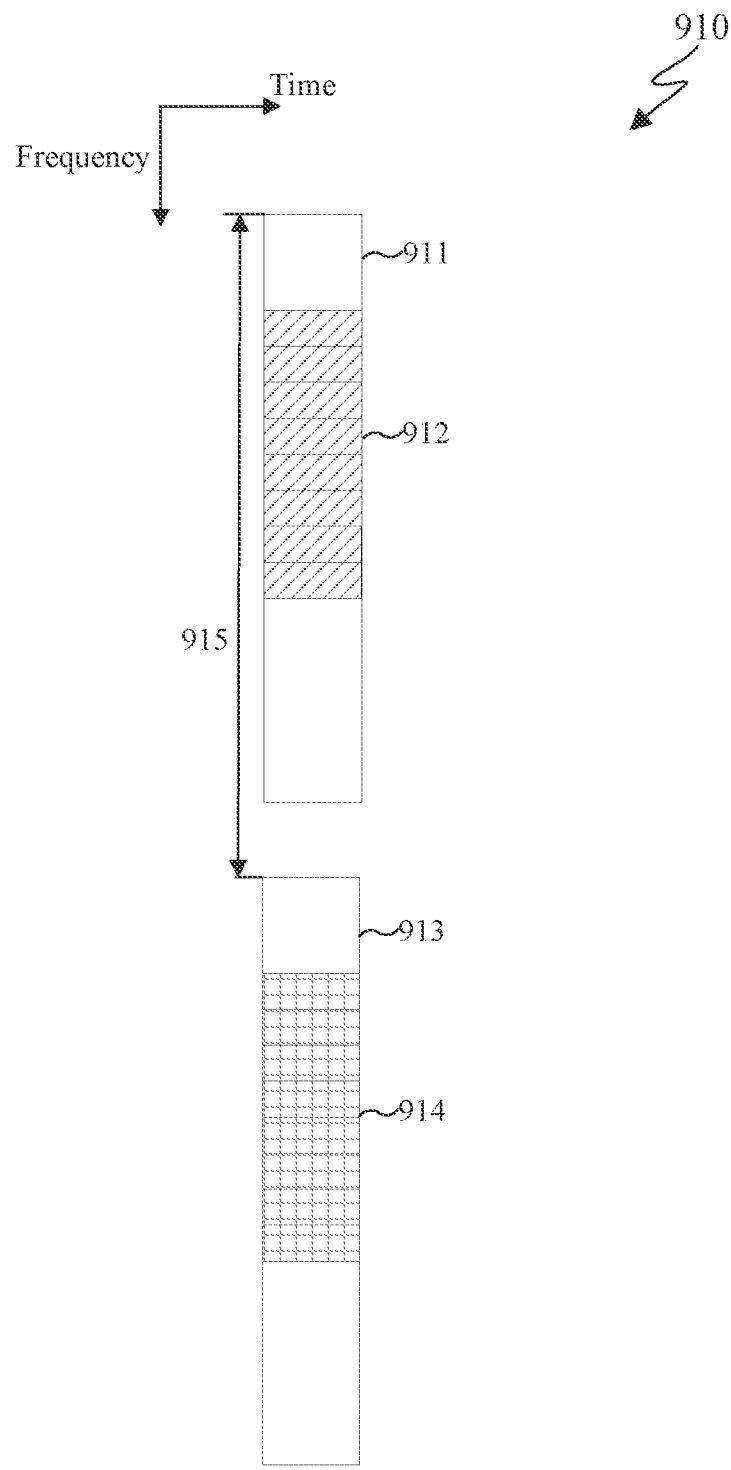
Figure 9C:
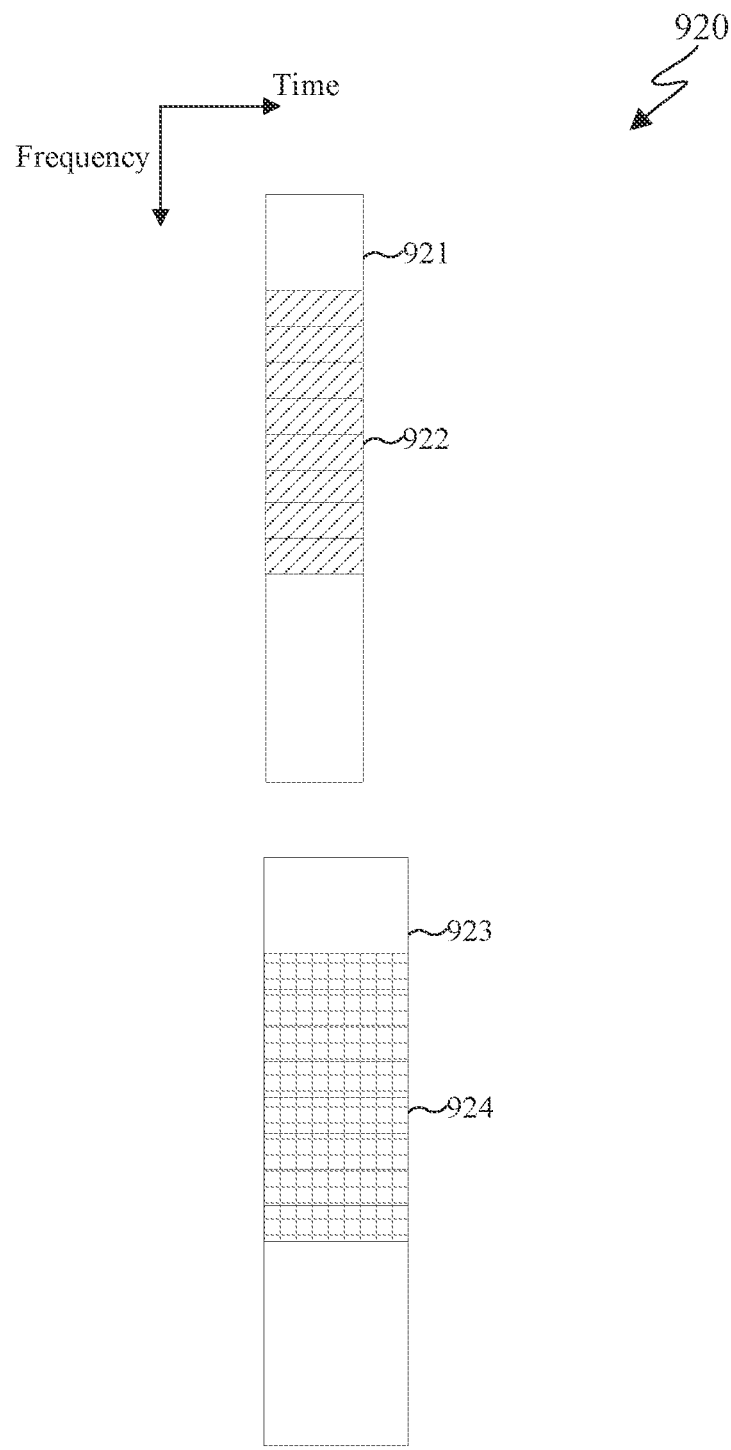
Figure 11A:
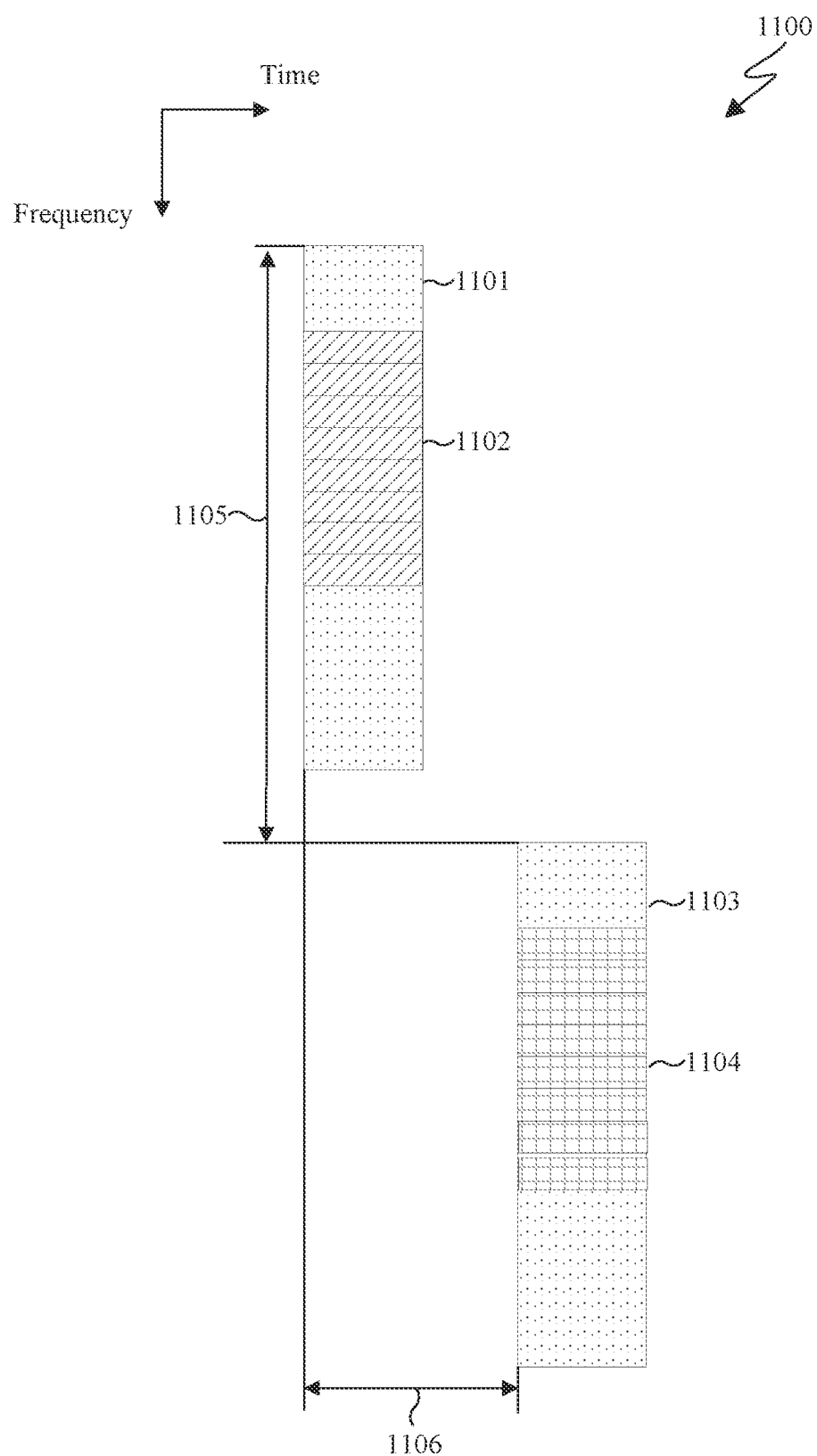
FIGS. 11A and 11B illustrate example diagrams of TDM and FDM for a number of PDCCH repetitions according to embodiments of the present disclosure.
Figure 11B:
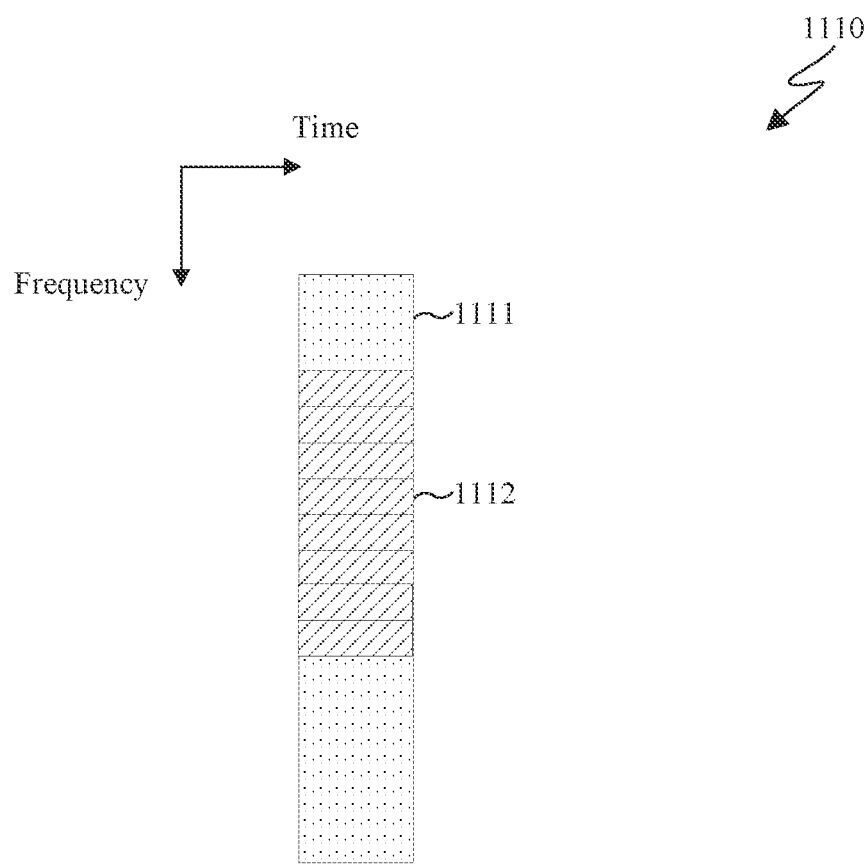
Figure 11B:
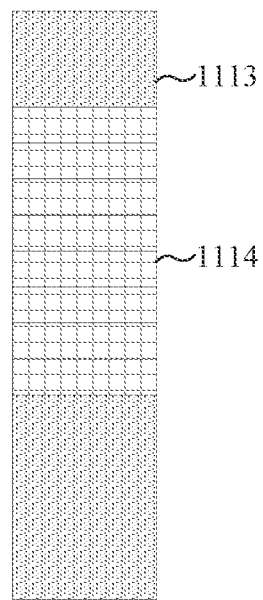
Figure 12:
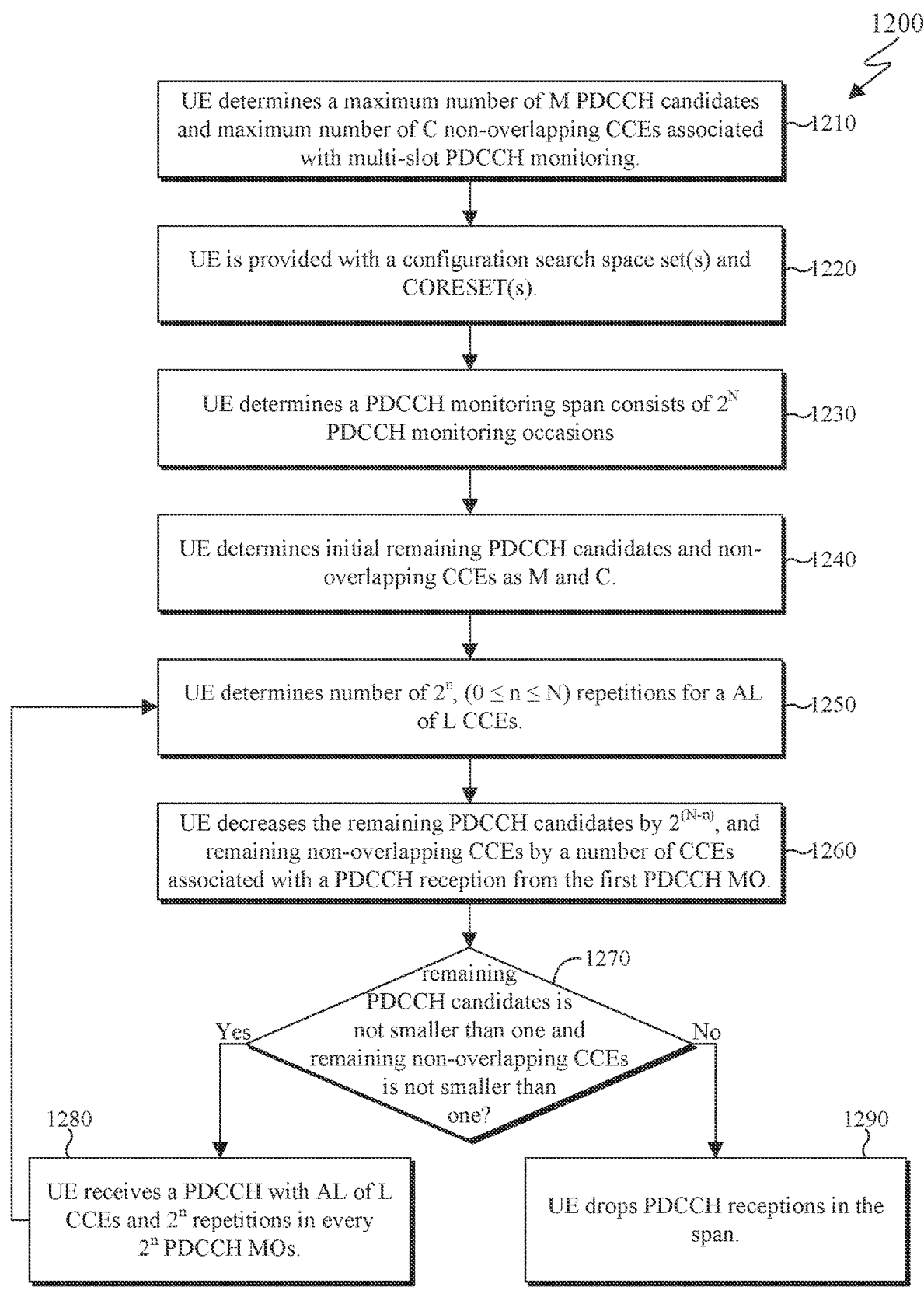
FIG. 12 illustrates an example method for receiving a downlink control information (DCI) format based on multiple PDCCH repetitions according to embodiments of the present disclosure.

FIGS. 9A, 9B, and 9C illustrate example diagrams 900, 910, and 920, respectively, of frequency division multiplexing (FDM) for a number of PDCCH repetitions according to embodiments of the present disclosure. FIGS. 10A, 10B, 10C, and 10D illustrate example diagrams 1000, 1010, 1020, and 1030, respectively, of time division multiplexing (TDM) for a number of PDCCH repetitions according to embodiments of the present disclosure. FIGS. 11A and 11B illustrate example diagrams 1100 and 1110, respectively, of TDM and FDM for a number of PDCCH repetitions according to embodiments of the present disclosure. FIG. 12 illustrates an example method 1200 for receiving a downlink control information (DCI) format based on multiple PDCCH repetitions according to embodiments of the present disclosure.

The steps of the method 1200 of FIG. 12 can be performed by any of the UEs 111-116 of FIG. 1, such as the UE 116 of FIG. 3. The diagrams 900-1100 as well as the method 1200 are for illustration only and other embodiments can be used without departing from the scope of the present disclosure.

Certain embodiments of this disclosure consider repetitions of a PDCCH transmission in one or multiple PDCCH reception occasions in time based on a rule for dropping or allocating PDCCH candidates that is associated with a maximum span duration Y, wherein the time duration of the one or multiple PDCCH reception occasions is equal to or smaller than Y.

A PDCCH can be transmitted from a serving cell to a UE in a number of $N_{rep} > 1$ PDCCH repetitions. The UE assumes that a same DCI is provided by each of the $N_{rep} > 1$ PDCCH repetitions. The $N_{rep}$ PDCCH repetitions have a same number of CCEs and a same number of coded bits in order to enable combining using polar codes. The UE can assume any of the following three methods for decoding received soft bits from the $N_{rep}$ PDCCH repetitions.

In one method (denoted as a first method), the UE combines soft bits from the $N_{rep}$ PDCCH repetitions and performs one decoding operation based on the combined soft bits without performing individual decoding for each PDCCH repetition or after partial combining of soft bits for some of the repetitions. This method does not increase a number of PDCCH decoding operations that a UE needs to perform and, assuming a same soft-combining for DM-RS, does not increase a number of channel estimates the UE needs to compute assuming same REs and same precoding for the $N_{rep}$ repetitions. However, this method assumes that a gNB configures a UE with a single number of $N_{rep}$ repetitions and there are no PDCCH candidates with a larger or smaller number of repetitions with $N_{rep} > 1$.

In another method (denoted as a second method), the UE decodes soft bits for each PDCCH repetition and for each partial number of repetitions including for the maximum number of repetitions. This method results to an increase in a number of decoding operations and channel estimations the UE needs to perform but allows the gNB to use any number of repetitions to transmit a PDCCH. For example, possible numbers of repetitions can be $2^N$, wherein N=1, 2, 4.

In yet another method (denoted as a third method), the UE decodes soft bits for a first PDCCH repetition, and the combined soft bits from the $N_{rep}$ PDCCH repetitions. This method provides a balance of the trade-offs of the first and third methods and allows PDCCH receptions either without repetitions or with a maximum number of repetitions.

In certain embodiments, a UE (such as the UE 116) can determine whether or not to receive with repetitions a PDCCH transmission based on any of the following five methods.

In one method (denoted as a first method), PDCCH repetitions are configured together with a PDCCH monitoring capability. For example, a UE supports a PDCCH reception with repetitions when the UE supports PDCCH monitoring capability based on minimum span gap, X, or maximum span duration, Y, where X or Y is larger than 1 slot or 14 symbols.

In another method (denoted as a second method), a search space set configuration includes an indication of whether the search space set is used for PDCCH repetitions. UE monitors PDCCH for detection of a DCI format according to the search space set based on repetitions of a PDCCH reception when the configuration includes PDCCH reception candidates with repetitions; otherwise, the UE assumes that each PDCCH reception candidate according to the search space set is received without repetitions. In one example of the indication, the indication is one bit providing a binary indication for whether or not a PDCCH candidate is to be received with repetitions. In another example, the indication is number of PDCCH monitoring occasions (MOs) within a periodicity for a PDCCH candidate with repetitions. When a configured number of PDCCH MOs is larger than one, the UE assumes that repetitions are enabled for a PDCCH reception according to the search space set; otherwise PDCCH repetitions are not enabled in the search space set. In another example, a search space configuration includes a number of PDCCH candidates per number of repetitions wherein, for example, all PDCCH candidates have a CCE aggregation level (AL) of 16 CCEs. In yet another example, a search space configuration includes a number of repetitions per PDCCH candidate/reception for each configured CCE AL. A search space set configuration indicates $2^N$ PDCCH monitoring occasions within a PDCCH monitoring periodicity. The configuration indicates a number of $2^n$ (n=0, or 1, ..., N) repetitions for an AL of L CCEs. The UE can receive a PDCCH reception for a DCI format based on $2^n$ PDCCH repetitions in every $2^n$ PDCCH monitoring occasions.

In another method (denoted as a third method), a CORESET configuration includes an indication of whether the CORESET is used for PDCCH repetitions. UE monitors PDCCH for detection of a DCI format according to a search space set associated with the CORESET based on repetitions of a PDCCH reception when the indication in the configuration indicates PDCCH repetitions; otherwise, the UE assumes that each PDCCH candidate according to a search space set associated with the CORESET is received without repetitions. In one example, the indication is one bit providing a binary indication for whether or not a PDCCH candidate is be received with repetitions. In another example, the indication is repetition number of the CORESET for each PDCCH MO according to a search space set associated with the CORESET. When the repetition number of the CORESET is larger than one, the UE assumes repetitions are enabled for a PDCCH reception in each PDCCH MO from a search space set that is associated with the CORESET; otherwise PDCCH repetitions are not enabled in any search space set associated with the CORESET.

In another method (denoted as a fourth method), a PDCCH transmission can be configured with repetitions based on a corresponding SCS configuration. The UE assumes repetitions for a PDCCH reception when the SCS configuration is larger than a predetermined SCS, for example, 120 KHz.

In yet another method (denoted as a fifth method), support of PDCCH repetitions is bundled with a UE class or UE type. For example, UE with reduced capability, such as one receiver antenna, supports PDCCH reception with repetitions.

Applicable search space sets that can be with repetitions for receptions of PDCCH candidates can be search space sets with PDCCH monitoring according to a UE-specific search space (USS) or search space sets with PDCCH monitoring according to a common search space (CSS). The search space sets can be configured by a system information block or by UE-specific higher layer signaling.

In certain embodiments, a UE (such as the UE 116) can be provided a configuration of one or more search space sets for receiving PDCCH candidates based on $N_{rep}$>1 PDCCH repetitions. The TCI state for the $N_{rep}$ repetitions can be same or different. The $N_{rep}$ repetitions for a reception of a PDCCH are mapped into $N_{rep}$ PDCCH reception occasions with non-overlapping time-frequency resources using FDM or TDM or both.

In certain embodiments, for FDM of $N_{rep}$ PDCCH repetitions, the $N_{rep}$ PDCCH reception occasions are in $N_{rep}$ sets of non-overlapping RBs in the frequency domain, including in RBs of different CORESETs. The time domain resource allocation for the $N_{rep}$ PDCCH reception can be same and determined based on the configuration of an associated search space set. For example, for a SCS of 480 kHz and first and second CORESETs of 100 MHz, a PDCCH candidate with 32 CCEs can have a first repetition over 16 CCEs and 3 symbols of the first CORESET and over 16 CCEs and 3 symbols of the second CORESET.

In a first approach of FDM for $N_{rep}$ PDCCH repetitions, a UE (such as the UE 116) determines frequency domain resources for the $N_{rep}$ PDCCH reception occasions based on non-overlapping CCEs within a CORESET. The UE assumes a single PDCCH candidate index for a PDCCH reception with $N_{rep}$ repetitions. For a PDCCH transmitted with an aggregation level (AL) of L CCEs, the UE assumes that the PDCCH is mapped to $N_{rep}$·L continuous CCEs within the CORESET, wherein the CCEs with indices {(n−1)·L, (n−1)·L+1 . . . , n·L−1} from the $N_{rep}$·L continuous CCEs are allocated to the nth (n=1, 2, . . . , $N_{rep}$) PDCCH repetition. The UE determines the first CCE index for the first PDCCH repetition based on a corresponding search space equation as defined in REF 3. Alternatively, the UE assumes that the PDCCH is mapped into $N_{rep}$ set of L continuous CCEs within the CORESET, where each set of L continuous CCEs is mapped with a PDCCH repetition. There is a predetermined CCE offset between the first CCE index for any two consecutive PDCCH repetitions.

In certain embodiments, for physical uplink control channel (PUCCH) resource determination for a PUCCH transmission with hybrid automatic repeat request acknowledgment (HARQ-ACK) information of up to two bits when the corresponding PUCCH resource set has a size larger than eight, a first CCE index of the first or the last PDCCH repetition can be used when the starting CCE indexes for the $N_{rep}$ PDCCH repetitions are not same. When the $N_{rep}$ PDCCH repetitions are transmitted based on the first approach of FDM, the first PDCCH repetition has lowest starting CCE index, while the last PDCCH repetition has largest starting CCE index.

In a second approach of FDM of $N_{rep}$ PDCCH repetitions, a UE (such as the UE 116) determines frequency domain resources allocation for the $N_{rep}$ PDCCH reception occasions based on repetitions of a CORESET. The UE is provided with a configuration of a CORESET. The UE determines the starting RB, $n_{RB0}$, and a number of consecutive RBs, $N_{RBs}$, for the CORESET based on the configuration. The UE determines that the CORESET is repeated $N_{rep}$ times in the frequency domain, wherein the starting RB for the (i+1)th (i=0, . . . , $N_{rep}$−1) repeated CORESET, $n_i^{startRB}$ is determined based on $n_{RB0}$ and a predetermined RB offset $O_{RBs}$, such as described in Equation (12), below. In Equation (12), $O_{RBs} \geq N_{RBs}$ and can be provided by higher layer signaling. For example, $O_{RBs}$ is equal to $N_{RBs}$. The UE assumes a same starting CCE index and number of CCEs in the $N_{rep}$ repeated CORESETs are used for the $N_{rep}$ PDCCH repetitions.

$$n_i^{startRB} = n_{RB0} + i \cdot O_{RBs} \quad (12)$$

In a third approach of FDM, a search space set can be associated with multiple CORESETs that the UE is configured by higher layers. For example, when the UE is configured a search space set that is associated with a first CORESET, is configured a PDCCH candidate with repetitions, a first repetition can be over CCEs of the first CORESET, a second repetition can be over CCEs of a CORESET with an index that is larger by one (modulo the number of CORESETs), a third repetition can be over CCEs of a CORESET with an index that is larger by two (modulo the number of CORESETs), and so on. Alternatively, the indexes of the CORESETs where repetitions can occur can be provided by higher layers or be implicitly determined based on other conditions such as CORESETs with a same transmission configuration indicator (TCI) state.

The diagram 900 as illustrated in FIG. 9A is an example of the first approach of FDM of $N_{rep}$ PDCCH repetitions.

As illustrated in FIG. 9A, a UE (such as the UE 116) is provided with a configuration of a CORESET, 901. A PDCCH is received by the UE in two repetitions. The First eight CCEs 902 correspond to the first repetition while the second eight CCEs 903 correspond to the second PDCCH repetition.

The diagram 910 as illustrated in FIG. 9B is an example of the second approach of FDM of $N_{rep}$ PDCCH repetitions.

As illustrated in FIG. 9B, a UE (such as the UE 116) is provided a configuration of a CORESET, 911, wherein the CORESET is repeated in the frequency domain, 913, based on an RB offset, 915. The UE receives a PDCCH over two PDCCH repetitions. The First eight CCEs 912 correspond to a first PDCCH repetition in a first CORESET, while the second eight CCEs 914 correspond to the second PDCCH repetition, in the repeated CORESET 913.

The diagram 920 as illustrated in FIG. 9C is an example of the third approach of FDM of $N_{rep}$ PDCCH repetitions.

As illustrated in FIG. 9C, a UE (such as the UE 116) is provided a configuration of two CORESETs. The UE receives a PDCCH candidate over two PDCCH repetitions. The first eight CCEs 922 correspond to a first PDCCH repetition in a first CORESET 921, while the second eight CCEs 924 correspond to the second PDCCH repetition, in the second CORESET 923.

In certain embodiments, for TDM of $N_{rep}$ PDCCH repetitions, the $N_{rep}$ PDCCH reception occasions are in $N_{rep}$ sets of non-overlapping symbols in time. A UE (such as the UE 116) determines the symbols for the $N_{rep}$ PDCCH reception occasions based on any of the following four approaches.

In a first approach of TDM, the $N_{rep}$ PDCCH reception occasions are in $N_{rep}$ sets of non-overlapping symbols within a slot or a group of X slots. The configuration of the search space set indicates the first symbol/slot for each of the $N_{rep}$ PDCCH reception occasions. For example, a bitmap is provided to the UE in the configuration of the search space set. For the nth bit with value "1" in the bitmap, the index of the nth bit indicates the index of the first symbol/slot of a PDCCH reception occasion for the nth PDCCH repetition.

In a second approach of TDM, the $N_{rep}$ PDCCH reception occasions are in $N_{rep}$ sets of non-overlapping symbols in $N_{rep}$ slots. The configuration of the search space set indicate a duration of $N_{rep}$ slots, wherein nth slot corresponds a PDCCH reception occasion for the nth PDCCH repetition.

In a third approach of TDM, the $N_{rep}$ PDCCH reception occasions are in $N_{rep}$ sets of non-overlapping symbols with a predetermined gap between the start of two consecutive PDCCH reception occasions, $O_{gap}$, in unit of one slot or one symbol. The UE determines first slot index or first symbol index of a PDCCH reception occasion for the first PDCCH repetition, $T_o$. The UE then determines the first slot index or first symbol index of a PDCCH reception occasion for the (n+1)th PDCCH repetition, $T_n$, n=0, 1, 2, ... $N_{rep}$−1, based on $O_{gap}$ and $T_o$, such as described in Equation (13), below. In Equation (13), $O_{gap}$ can be provided to UE based on higher layer configuration, for example, $O_{gap}$ equals to CORESET duration configured by higher layers. $T_o$ can be provided to UE based on the PDCCH monitoring periodicity and offset in the configuration of search space set.

$$T_n = T_0 + n \cdot O_{gap} \qquad (13)$$

In a fourth approach of TDM, the $N_{rep}$ PDCCH reception occasions are determined according to the search space set configuration. For example, consecutive PDCCH monitoring occasions can correspond to a number of repetitions wherein, for a maximum of $N_{rep}^{max}$ repetitions, a group of $N_{rep}^{max}$ consecutive PDCCH monitoring occasions is used. Groups of $N_{rep}^{max}$ consecutive PDCCH monitoring occasions can be disjoint without any common PDCCH monitoring occasion or can overlap over a number of PDCCH monitoring occasions such as over $N_{rep}^{max}$−1 PDCCH monitoring occasions. For example, for $N_{rep}^{max}$=4, the repetitions can be disjoint over PDCCH monitoring occasions {0, 1, 2, 3} and {4, 5, 6, 7} or can be overlapping over PDCCH monitoring occasions {0, 1, 2, 3} and {1, 2, 3, 4}. Disjoint repetitions for PDCCH candidates result to simpler PDCCH monitoring complexity and larger latency for a PDCCH transmission with repetition relative to overlapping repetitions for PDCCH candidates.

In certain embodiments, the frequency domain resource allocation for the $N_{rep}$ PDCCH reception based on TDM can be the same and determined based on the configuration of an associated CORESET. Since the $N_{rep}$ PDCCH repetitions are from the same search space set associated with a single CORESET, the allocated CCEs, including starting CCE index, for the $N_{rep}$ PDCCH repetitions are same.

Figure 10A:
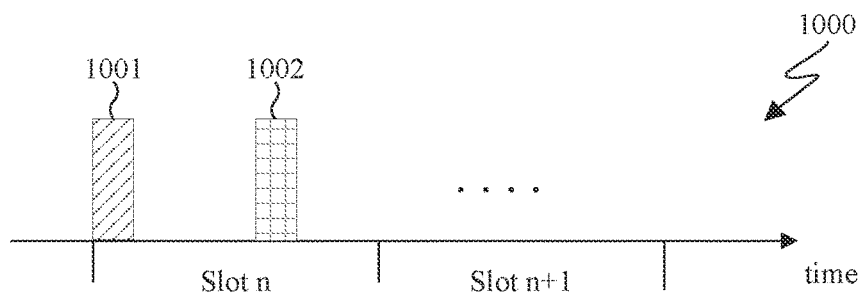
FIGS. 10A, 10B, 10C, and 10D illustrate example diagrams of time division multiplexing (TDM) for a number of PDCCH repetitions according to embodiments of the present disclosure.

The diagram 1000 as illustrated in FIG. 10A is an example of the first approach of TDM of $N_{rep}$ PDCCH repetitions.

As illustrated in FIG. 10A, a UE (such as the UE 116) is configured a search space set for PDCCH candidate receptions, including ones with repetitions. The configuration of the search space set indicates first and second PDCCH monitoring/reception occasions within a slot n, 1001 and 1002, respectively. The UE can receive a PDCCH with first and second repetitions for the first and second PDCCH monitoring occasions, respectively.

Figure 10B:
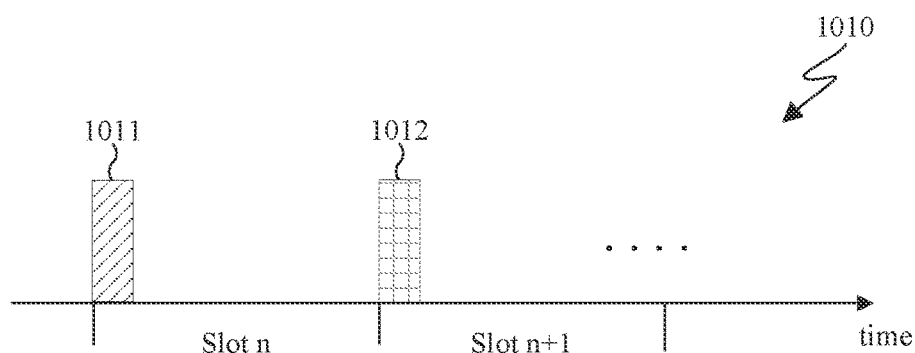

The diagram 1010 as illustrated in FIG. 10B is an example of the second approach of TDM of $N_{rep}$ PDCCH repetitions.

As illustrated in FIG. 10B, a UE (such as the UE 116) is configured a search space set for PDCCH receptions with repetitions that includes a PDCCH monitoring periodicity of ks slots. The configuration of the search space set indicates two PDCCH monitoring/reception occasions in two consecutive slots. First and second PDCCH receptions occasions, 1011 and 1012 respectively, correspond to first and second repetitions for a PDCCH candidate. The two PDCCH reception occasions are within a PDCCH monitoring period of ks slots.

Figure 10C:
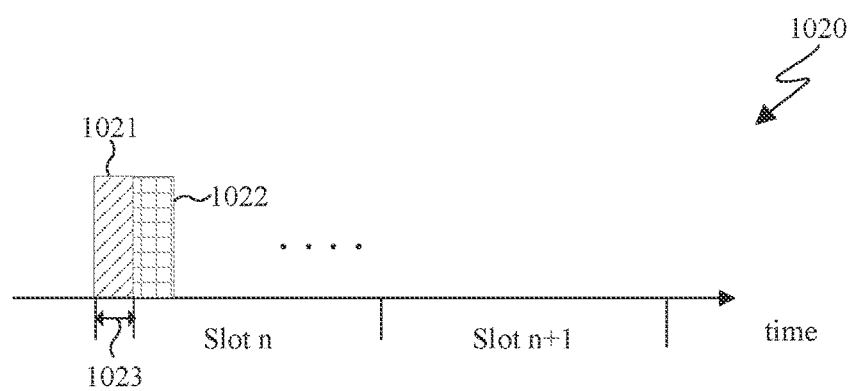

The diagram 1020 as illustrated in FIG. 10C is an example of the third approach of TDM of $N_{rep}$ PDCCH repetitions.

As illustrated in FIG. 10C, a UE (such as the UE 116) is configured a search space set that support receptions of PDCCH candidates with repetitions. First and second PDCCH reception occasions, 1021 and 1022, correspond to first and second PDCCH repetitions of a first PDCCH candidate, respectively. Two consecutive PDCCH reception occasions for two repetitions of a PDCCH candidate are separated by a gap, 1023. The gap equals the duration of the CORESET that is associated with the search space set for PDCCH receptions.

Figure 10D:
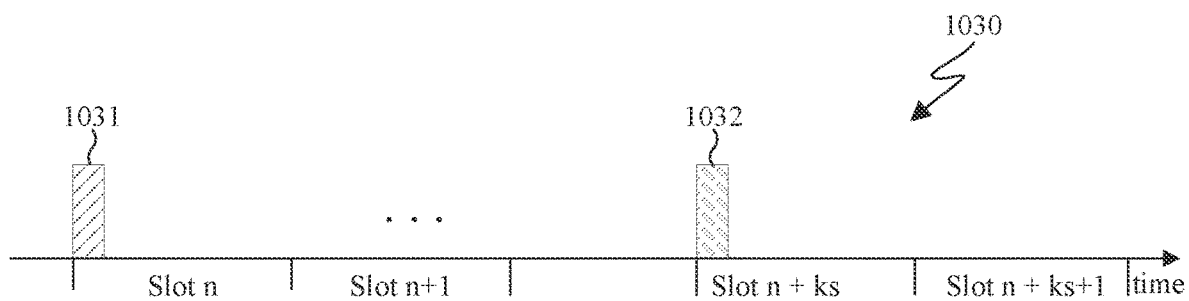

The diagram 1030 as illustrated in FIG. 10D is an example of the fourth approach of TDM of $N_{rep}$ PDCCH repetitions.

As illustrated in FIG. 10D, a UE (such as the UE 116) is configured a search space set for PDCCH receptions with repetitions that includes a PDCCH monitoring periodicity of ks slots. The configuration of the search space set indicates two PDCCH monitoring/reception occasions in two periods. First and second PDCCH receptions occasions, 1031 and 1032 respectively, correspond to first and second repetitions for a PDCCH candidate.

In certain embodiments, for TDM and FDM of $N_{rep}$ PDCCH repetitions, the $N_{rep}$ PDCCH reception occasions are in $N_{rep}$ sets of non-overlapping time and frequency resources. A UE (such as the UE 116) determines the symbols for the $N_{rep}$ PDCCH reception occasions based on any of the following approaches.

In the first TDM and FDM approach, a search space set can be configured for PDCCH receptions with $N_{rep}$ repetitions. The search space set configuration can indicate multiple PDCCH monitoring occasions in time per PDCCH monitoring period. The UE can be provided with an RB offset between the starting RB of two consecutive PDCCH monitoring occasions, and a number of $N_{RBs}^{MO}$ RBs for the multiple PDCCH monitoring occasions. $N_{RBs}^{MO}$ for each PDCCH monitoring occasion can be determined based on a number of $N_{RBs}^{CORESET}$ RBs of one or more CORESETs associated with the search space set. For example, the search space set is associated with one CORESET, the number of RBs for each PDCCH monitoring occasion is same as the number of RBs of the CORESET, such that $N_{RBs}^{MO} = N_{RBs}^{CORESET}$. The CORESET is repeated multiple times in the multiple PDCCH monitoring occasions. For another example, the search space set is associated with one CORESET, the number of RBs for each PDCCH monitoring occasion is a subset of the number of RBs of the CORESET, such that $N_{RBs}^{MO} = N_{RBs}^{CORESET}/N_{rep}$. The CORESET is divided into $N_{rep}$ sub-CORESETs, and nth PDCCH MO for nth PDCCH repetition is associated with the nth sub-CORESET. For yet another example, the search space set is associated with $N_{rep}$ CORESETs. $N_{RBs}^{MO}$ for ith PDCCH MO is same as the $N_{RBs}^{CORESET}$ for the nth CORESET. The RB offset is equal to or larger than the number of RBs, so that the multiple PDCCH monitoring occasions are mapped into non-overlapping RBs in the frequency domain. A PDCCH monitoring occasion can be a slot configured with PDCCH candidates to monitor or a number of consecutive symbols configured with PDCCH candidates to monitor. For the multiple PDCCH monitoring occasions, there can be a time offset between the last symbol of a first PDCCH monitoring occasion and a first symbol of the next PDCCH monitoring occasion after the first PDCCH monitoring occasions, where the time offset is no less than a time delay needed for the UE to switch between two PDCCH reception occasions in orthogonal frequency locations, for example due to corresponding CORESETs using different TCI states or due to corresponding CORESETs being located in different bandwidths that require the UE to retune.

The diagram 1100 as illustrated in FIG. 11A is an example of the first approach of TDM and FDM of $N_{rep}$ PDCCH repetition.

As illustrated in FIG. 11A, a UE (such as the UE 116) is configured a search space set for PDCCH receptions with repetitions. The configuration of the search space set indicates two PDCCH monitoring/reception occasions within one PDCCH monitoring period. The UE receives a PDCCH over two PDCCH repetitions. First and second PDCCH receptions occasions, 1101 and 1103 respectively, correspond to first and second repetitions for a PDCCH candidate. First eight CCEs 1102 correspond to a first PDCCH repetition in a PDCCH monitoring occasion, while the second eight CCEs 1104 correspond to the second PDCCH repetition, in the second PDCCH monitoring occasion, 1104. The configuration indicates a time gap between the two PDCCH monitoring occasion, 1106, and an RB offset between the two PDCCH monitoring occasions, 1105.

In a second TDM and FDM approach, the UE can be configured multiple search space sets to monitor PDCCH for detection of a DCI format, wherein each of the multiple search space sets is associated with a respective CORESET from multiple CORESETs, and the UE can be configured to combine demodulated symbols from respective multiple receptions a same PDCCH candidate in the multiple CORESETs.

When N>1 search space sets are linked for PDCCH repetitions, and UE is configured to perform PDCCH monitoring per group of X slots in the N>1 search space sets. UE expects the same number of non-overlapping PDCCH monitoring occasions per group of X slots based on corresponding monitoringSlotsWithinSlotGroup-r17 for each of the N>1 search space sets. The N>1 search space sets have the same number of monitoring occasions within group of X slots and n-th monitoring occasion of one SS set is linked to n-th monitoring occasion of the other SS sets The diagram 1110 as illustrated in FIG. 11B is an example of the second approach of TDM and FDM of $N_{rep}$ PDCCH repetition.

As illustrated in FIG. 11B, a UE (such as the UE 116) is configured two search space sets for PDCCH receptions with repetitions. The two search space sets have same PDCCH monitoring periodicity. The first search space set is associated with a first CORESET that has a duration of 2 symbols. The second search space set is associated with a second CORESET that has a duration of 3 symbols. For a PDCCH monitoring periodicity, the UE receives a PDCCH over two PDCCH repetitions. First and second PDCCH receptions occasions, 1111 and 1113 respectively, correspond to first and second repetitions for a PDCCH candidate. The first eight CCEs 1112 in the first CORESET correspond to a first PDCCH repetition in a PDCCH monitoring occasion from the first search space set, while the second eight CCEs 1114 in the second CORESET correspond to the second PDCCH repetition, in the second PDCCH monitoring occasion from the second search space set.

In certain embodiments, for PDCCH monitoring based on blind detection, a UE (such as the UE 116) is configured to monitor PDCCHs with a time gap between a start of any two consecutive PDCCH monitoring spans that is not smaller than X>1 slots for a combination (X, Y) where Y is the maximum PDCCH monitoring span duration and X is a minimum number of symbols or slots between the first symbols of two consecutive span durations. Y≤X, when Y=X, the combination can be simplified to one parameter, for example Y. The UE can be provided with a maximum number of $M_{max}$ PDCCH candidates and a maximum number of $C_{max}$ non-overlapping CCEs for PDCCH monitoring. A PDCCH monitoring span can be in consecutive symbols or slots configured with PDCCH reception/monitoring occasions. When a UE supports $N_{rep}$ PDCCH repetitions for a PDCCH candidate, the UE allocates or drops PDCCH candidates based on one of the following four methods.

In one method (denoted as a first method), the UE performs one decoding for a DCI format and counts one PDCCH candidate for receiving $N_{rep}$ PDCCH repetitions. The UE does not expect to decode number of PDCCH candidates larger than $M_{max}$ for each PDCCH monitoring span. The UE counts only non-overlapping CCEs within a PDCCH occasion that corresponds to a PDCCH repetition for receiving the $N_{rep}$ PDCCH repetitions. The UE does not expect to have a number of non-overlapping CCEs that is larger than $C_{max}$ for each PDCCH monitoring span.

In another method (denoted as a second method), the UE performs a decoding for a DCI format in each repetition and counts $N_{rep}$ PDCCH candidates for receiving the $N_{rep}$ PDCCH repetitions. The UE does not expect to decode a number of PDCCH candidates larger than $M_{max}$ for each PDCCH monitoring span. The UE counts non-overlapping CCEs within $N_{rep}$ PDCCH occasions that correspond to the $N_{rep}$ PDCCH repetitions for receiving the $N_{rep}$ PDCCH repetitions. The UE does not expect to have number of non-overlapping CCEs larger than $C_{max}$ for each PDCCH monitoring span.

In another method (denoted as a third method), the UE counts $N_{rep}$ PDCCH candidates for receiving the $N_{rep}$ PDCCH repetitions. The UE does not expect to decode number of PDCCH candidates larger than $M_{max}$ for each PDCCH monitoring span. The UE counts only non-overlapping CCEs within a PDCCH occasion that corresponds to a PDCCH repetition for receiving the $N_{rep}$ PDCCH repetitions. The UE does not expect to have a number of non-overlapping CCEs that is larger than $C_{max}$ for each PDCCH monitoring span.

In yet another method (denoted as a fourth method), the UE counts one PDCCH candidate for receiving the $N_{rep}$ PDCCH repetitions. The UE does not expect to decode a number of PDCCH candidates larger than $M_{max}$ for each PDCCH monitoring span. The UE counts non-overlapping CCEs within $N_{rep}$ PDCCH occasions corresponds to the $N_{rep}$ PDCCH repetitions for receiving the $N_{rep}$ PDCCH repetitions. This can be applicable when the $N_{rep}$ PDCCH repetitions are received in non-overlapping RBs in the frequency domain. The UE does not expect to have number of non-overlapping CCEs larger than $C_{max}$ for each PDCCH monitoring span.

The method 1200 as illustrated in FIG. 12 describes an example procedure for receiving a DCI format based on multiple PDCCH repetitions.

In step 1210, a UE (such as the UE 116) determines a maximum number of $M_{max}$ PDCCH candidates and maximum number of $C_{max}$ non-overlapping CCEs for PDCCH monitoring. In step 1220, the UE is provided with a configuration of search space set(s) and CORESET(s) for PDCCH receptions. In step 1230, the UE determines a PDCCH monitoring span consists of $2^N$ PDCCH monitoring occasions. In step 1240, the UE determines initial PDCCH candidates for the span as $M_{max}$, and initial non-overlapping CCEs for the span as $C_{max}$. In step 1250, the UE determines $2^n$ (0<=n<=N) PDCCH repetitions according to the configuration, for a configured AL of L CCEs. In step 1260, the UE decreases the remaining PDCCH candidates in the span by $2^{N-n}$, and the remaining non-overlapping CCEs in the span by a number of non-overlapping CCEs associated with a PDCCH reception from the first PDCCH monitoring occasion. In step 1270, the UE determines whether a number of remaining PDCCH candidates is not smaller than zero and whether a number of remaining non-overlapping CCEs is not smaller than zero.

If both the number of remaining PDCCH candidates and the number of remaining CCEs are not smaller than zero after allocation to $2^{N-n}$ PDCCH candidates (as determined in step 1270), the UE in step 1280 decodes a DCI format based on $2^n$ PDCCH repetitions in every $2^n$ PDCCH monitoring occasions. Otherwise, the UE in step 1290 drops reception of the PDCCH candidate in the span.

In certain embodiments, for determining the Type-2 HARQ-ACK codebook when a PDCCH candidate is received with $N_{rep}$ PDCCH repetitions in $N_{rep}$ PDCCH reception occasions over multiple slots, a UE assumes the earlier PDCCH reception occasion is used as the start of the PDCCH reception occasion in order for ordering values of a downlink assignment index (DAI) field according to a start time of PDCCH reception occasions. For example, for a Type-2 HARQ-ACK codebook determination, a PDCCH candidate received with four repetitions over slots 0, 1, 2, and 3 is order prior to a PDCCH candidate received without repetitions in slot 1.

In certain embodiments, for determining out-of-order reception/transmission for PDCCH-to-physical downlink shared channel (PDSCH) and PDCCH-to-physical uplink shared channel (PUSCH) when a PDCCH reception is with $N_{rep}$ PDCCH repetitions in respective $N_{rep}$ PDCCH reception occasions, the UE assumes the earliest PDCCH reception occasion corresponding to the first PDCCH repetition is used as the reference.

In certain embodiments, for determining scheduling offset of K0 when a DCI format is provided by a PDCCH that is received over $N_{rep}$ PDCCH repetitions in $N_{rep}$ PDCCH reception occasions, a UE assumes that K0 indicates slot offset between a last PDCCH reception occasion corresponding to a last PDCCH repetition and a PDSCH scheduled by the DCI format.

In certain embodiments, for determining scheduling offset of K2 when a DCI format is provided by a PDCCH that is received over $N_{rep}$ PDCCH repetitions in $N_{rep}$ PDCCH reception occasions, the UE assumes that K2 indicates a slot offset between a last PDCCH reception occasion corresponding to a last PDCCH repetition and a PUSCH scheduled by the DCI format.

In certain embodiments, for determining an aperiodic channel state information-reference signal (CSI-RS) triggering offset when a DCI format is provided by a PDCCH that is received over $N_{rep}$ PDCCH repetitions in $N_{rep}$ PDCCH reception occasions, the UE assumes the aperiodic CSI-RS triggering offset indicates slot offset between latest last PDCCH reception occasion corresponding to a last PDCCH repetition and a CSI-RS resource occasion scheduled by the DCI format.

In certain embodiments, for determining a first symbol of a PDSCH with mapping Type B when the PDSCH is scheduled by a DCI format provided by a PDCCH that is received over $N_{rep}$ PDCCH repetitions in $N_{rep}$ PDCCH reception occasions, the UE assumes that a first symbol of a last PDCCH reception occasion corresponds to a last PDCCH repetition from the $N_{rep}$ PDCCH repetitions is used as a reference.

In certain embodiments, when a PDSCH is scheduled by a DCI format provided by a PDCCH that is received over $N_{rep}$ PDCCH repetitions in $N_{rep}$ PDCCH reception occasions, and REs of the $N_{rep}$ PDCCH reception occasions overlap with REs of the PDSCH reception, the PDSCH is rate matched around the REs of the $N_{rep}$ PDCCH reception occasions and the corresponding DM-RS. The UE excludes the REs used for the $N_{rep}$ PDCCH reception occasions and the corresponding DM-RS for PDSCH.

Although FIG. 9A illustrates the diagram 900, FIG. 9B illustrates the diagram 910, FIG. 9C illustrates the diagram 920, FIG. 10A illustrates the diagram 1000, FIG. 10B illustrates the diagram 1010, FIG. 10C illustrates the diagram 1020, FIG. 10D illustrates the diagram 1030, FIG. 11A illustrates the diagram 1100, FIG. 11B illustrates the diagram 1110, and FIG. 12 illustrates the method 1200 various changes may be made to FIGS. 9A-12. For example, while the method 1200 is shown as a series of steps, various steps could overlap, occur in parallel, occur in a different order, or occur multiple times. In another example, steps may be omitted or replaced by other steps. For example, steps of the method 1200 can be executed in a different order.

Embodiments of the present disclosure describe enhancements of PDCCH DM-RS. This is described in the following examples and embodiments, such as those of FIGS. 13-16.

Figure 13:
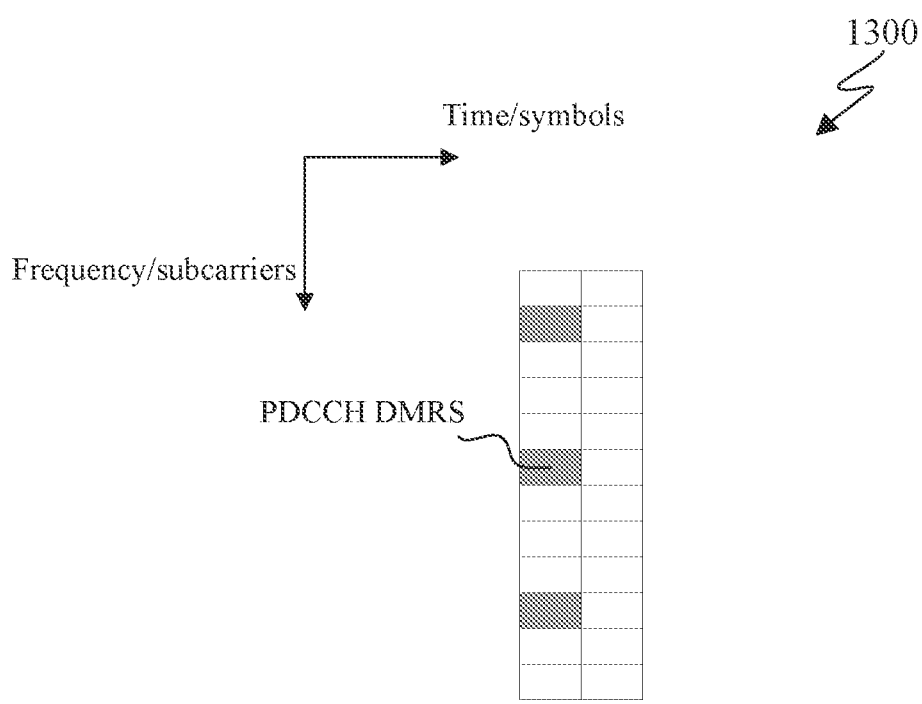
FIGS. 13, 14, and 15 illustrate example diagrams of resource elements (RE) mapping for PDCCH dedicated demodulation (DM) reference signals (RS) according to embodiments of the present disclosure.
Figure 14:
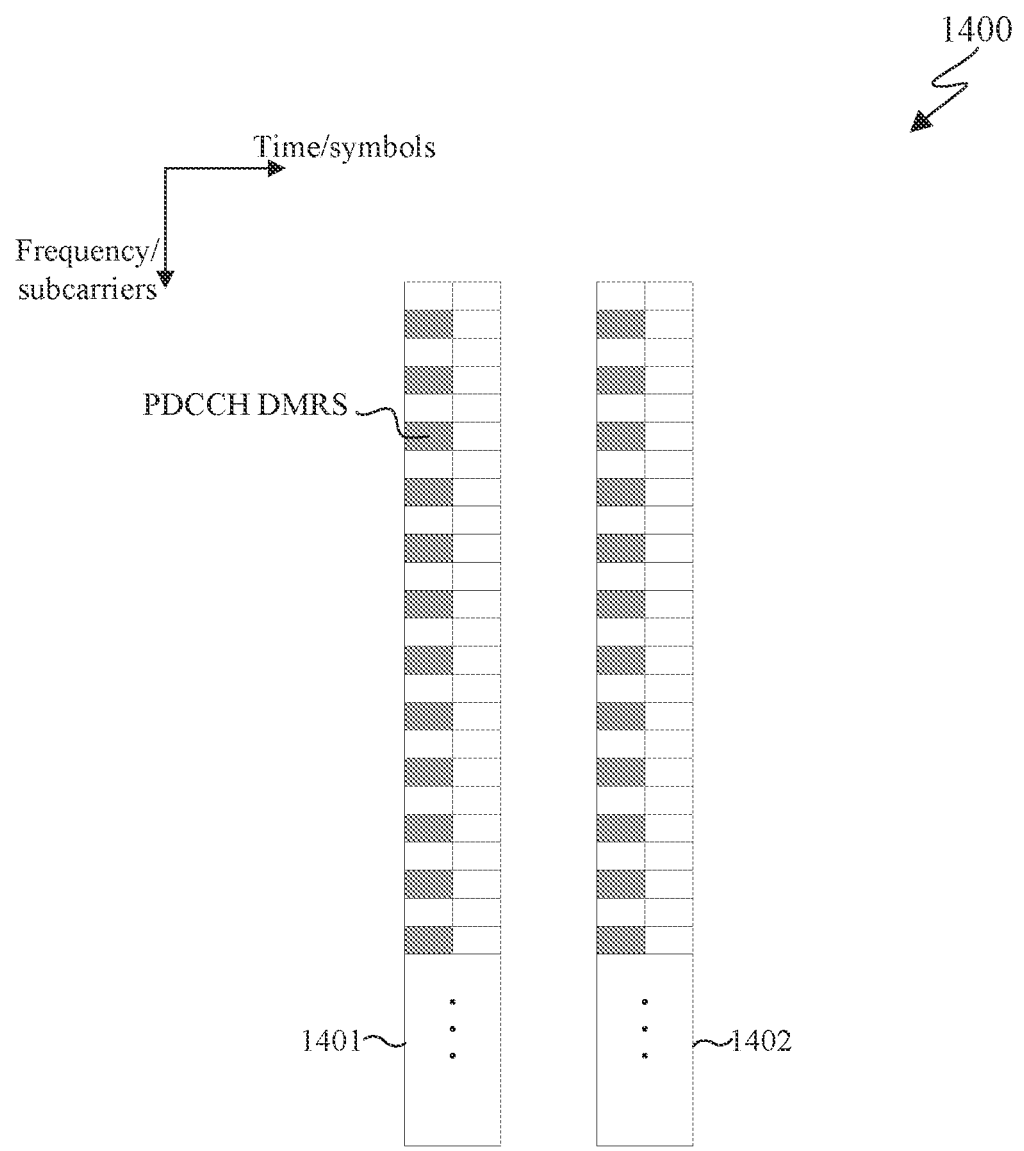
Figure 15:
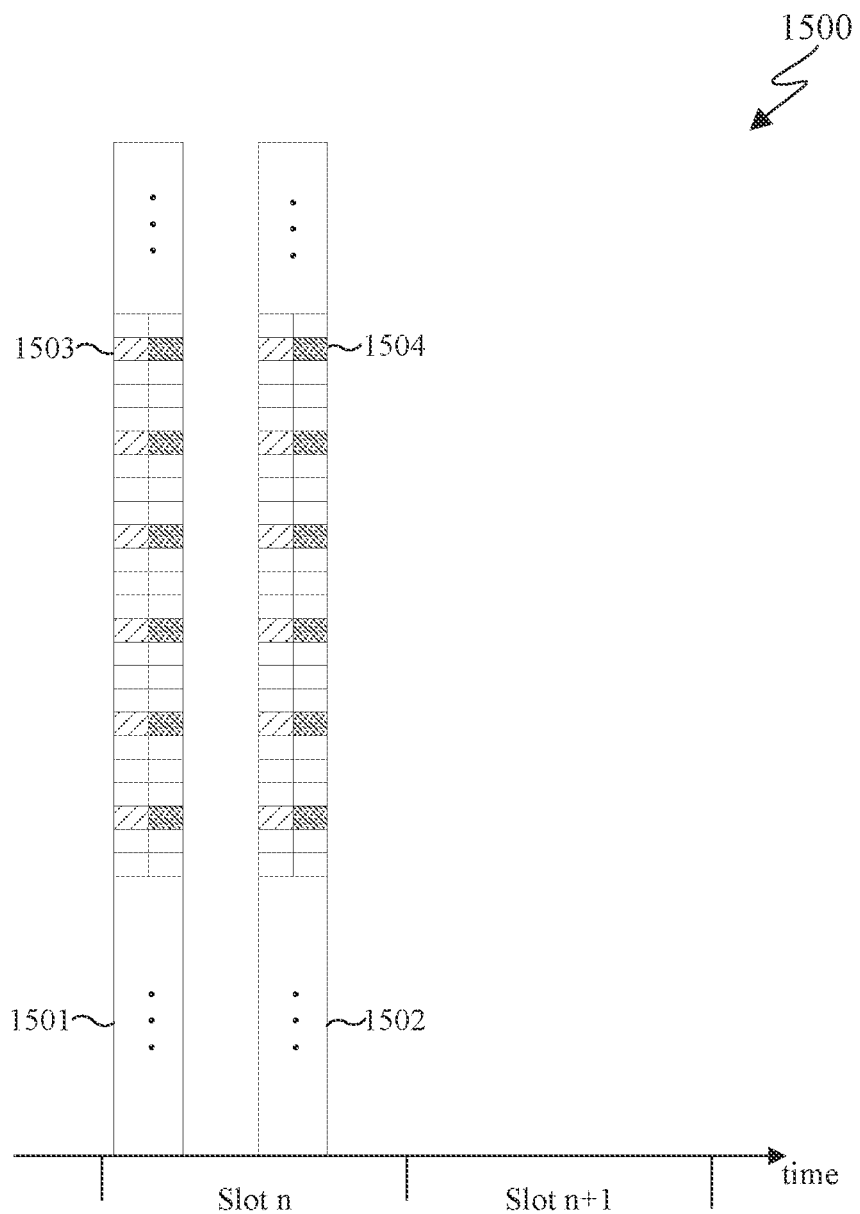
Figure 16:
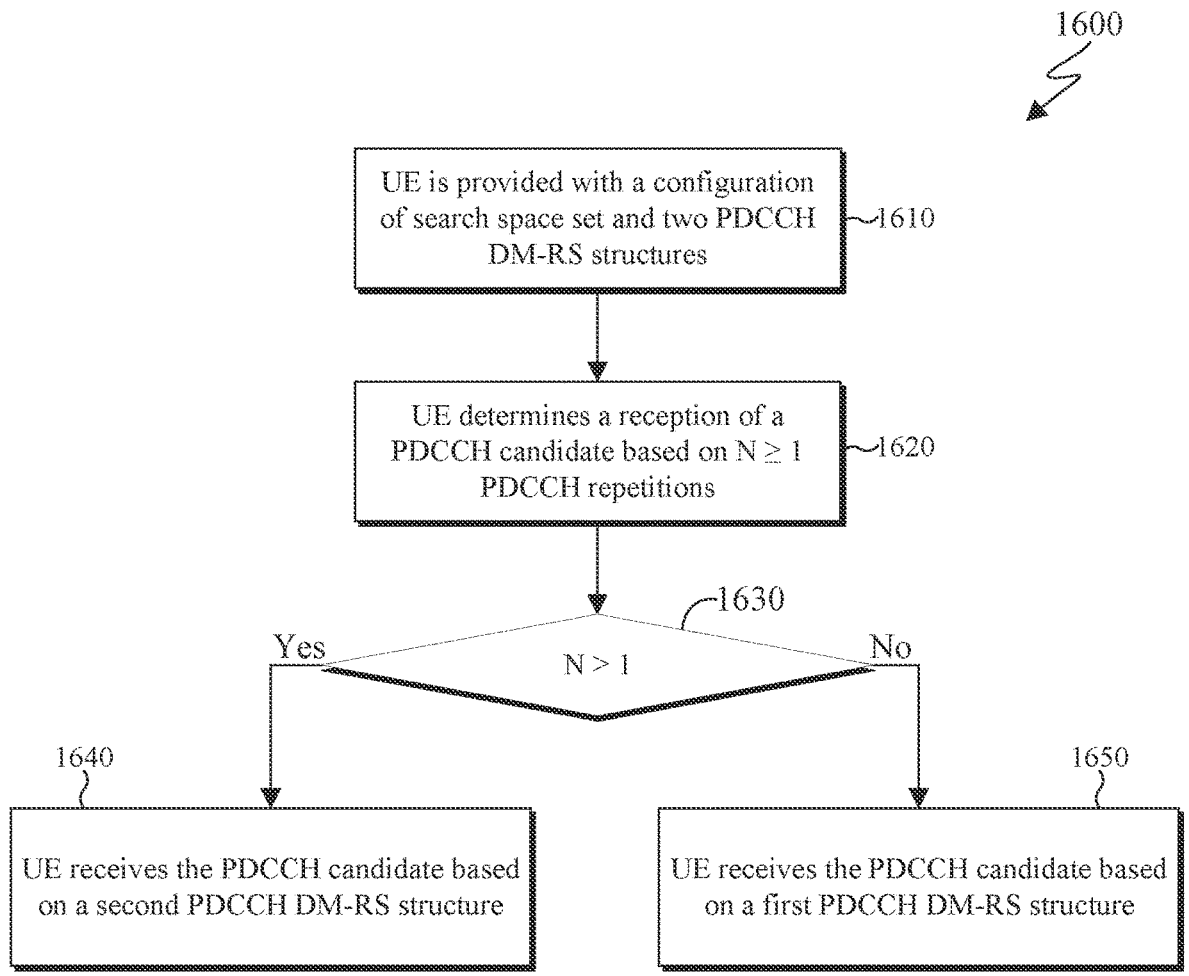
FIG. 16 illustrates an example method for determining PDCCH DM-RS structure according to embodiments of the present disclosure.

FIGS. 13, 14, 15 illustrate example diagrams 1300, 1400, and 1500 of RE mapping for PDCCH DM-RS according to embodiments of the present disclosure. FIG. 16 illustrates an example method 1600 for determining PDCCH DM-RS structure according to embodiments of the present disclosure.

The steps of the method 1600 of FIG. 16 can be performed by any of the UEs 111-116 of FIG. 1, such as the UE 116 of FIG. 3. The diagrams 1300-1500 as well as the method 1600 are for illustration only and other embodiments can be used without departing from the scope of the present disclosure.

Certain embodiments, of this disclosure considers a DM-RS design for a PDCCH with large SCS.

For determining an allocation of DM-RS resources/REs for a PDCCH in a time domain, a subset of symbol(s) from a number of $N_{symb}^{PDCCH}$ consecutive symbols used for DM-RS in the PDCCH. In one method, the DM-RS of the PDCCH is located only on one symbol, such as the first symbol, from the number of $N_{symb}^{PDCCH}$ consecutive symbols.

In another method, the DM-RS of the PDCCH is located on a symbol every $O_{symb}^{DRMS} \geq 1$ symbols from the number of $N_{symb}^{PDCCH}$ consecutive symbols. The symbol can be a first symbol for every $O_{symb}^{DRMS} \geq 1$ symbols. $O_{symb}^{DRMS}$ can be either provided to the UE by higher layer signaling or be defined in the specification of the system operation, for example, $O_{symb}^{DRMS}=2$ or 3. In one example, $O_{symb}^{DRMS}$ is provided in a configuration of a search space set, when $O_{symb}^{DRMS}=1$, UE assumes each symbol used for a PDCCH is used for DM-RS resources mapping When $O_{symb}^{DRMS}$ is not provided to the UE, the UE assume a default value, for example $O_{symb}^{DRMS}=1$.

In certain embodiments, to determine an allocation of DM-RS resources for a PDCCH in a frequency domain, the DM-RS occupies a subset of subcarriers in an RB. For a symbol l used for resource mapping of PDCCH DM-RS, the UE shall assume the sequence $r_l(m)$ is mapped to resource elements $(k, l)_{p,\mu}$ according to Equations (13)-(16).

$$a_{k,l}^{p,\mu} = \beta_{DMRS}^{PDCCH} \cdot r_l(3n+k') \quad (13)$$

$$k = nN_{SC}^{RB} + \rho \cdot k' + k_0 \quad (14)$$

$$k' = 0,1,2,\ldots,\rho-1, \quad (15)$$

$$n = 0,1,\ldots \quad (16)$$

In Equation (13), $\beta_{DMRS}^{PDCCH}$ is scaling factor based on transmit power of PDCCH DM-RS. In Equation (14), ρ indicates PDCCH DM-RS are mapped into a SC every ρ continuous SCs, and $k_0$ indicates SC offset.

For example, ρ or $k_0$, can be predetermined in the specification of the system operation, for example, ρ=4, $k_0$=1. For another example, p or $k_0$ can be provided by higher layer signaling, for example in the configuration of a search space set.

In certain embodiments, a UE (such as the UE 116) can support one or more PDCCH DM-RS structures for PDCCH receptions. A DM-RS structure can include the DM-RS structure defined in REF 1 or any DM-RS structure define in this disclosure. When the UE supports more than one PDCCH DM-RS structures, a first of the PDCCH DM-RS structures can includes the REs of a second PDCCH DM-RS structure such that the REs allocated for the second DM-RS structure are a subset of the REs allocated for the first DM-RS structure. The non-overlapping CCEs for channel estimation can be different for different PDCCH DM-RS structures. For example, a UE assumes a predetermined scaling factor, $0<s_i \le 1$, for a i-th PDCCH DM-RS structure, where $s_1=1$ for a first PDCCH structure that includes RES of a second PDCCH DM-RS structure. $s_i$ can indicate a ratio of occupied REs of the ith PDCCH DM-RS structure to occupied REs of the first PDCCH DM-RS structure. For determining PDCCH candidate dropping based on a UE capability to decode a maximum number of $M_{max}$ PDCCH candidates and perform channel estimation over a maximum number of $C_{max}$ non-overlapping CCEs for PDCCH monitoring, the UE can determine a number of non-overlapping CCEs used for a PDCCH reception in a PDCCH monitoring occasion to be $s_i \cdot C$, where C is the number of non-overlapping CCEs used for the a PDCCH reception, $s_i$ is the scaling factor associated with the PDCCH DM-RS structure used for the PDCCH reception.

For a PDCCH reception in the search space set, UE can determine the PDCCH DM-RS structure based on one of the following two methods.

In a first method, the UE determines the DM-RS structure based on configuration of the search space set. In one example, the configuration of the search space set includes an explicit indicator of a PDCCH DM-RS structure used for all PDCCH receptions in the search space set.

In a second method, the UE determine DM-RS structure based on configured repetitions of a PDCCH candidate. In one example, when the UE is configured to monitor a PDCCH candidate with one PDCCH repetition, the UE assumes a legacy PDCCH DM-RS structure, for example as defined in REF 1, for the PDCCH reception. When the UE is configured to monitor a PDCCH with $N_{rep}>1$ PDCCH repetitions, the UE assumes another PDCCH DM-RS structure, such as a DM-RS that is located in one symbol per PDCCH candidate and has larger frequency domain density ρ for the $N_{rep}>1$ PDCCH repetitions. In another example, when the UE is configured to monitor a PDCCH candidate with $N_{rep}>=1$ PDCCH repetitions, the UE assumes a legacy PDCCH DM-RS structure, such as the one defined in REF 1, for a first PDCCH repetition in a first PDCCH monitoring occasion, and another PDCCH DM-RS structure, such as one that has symbol per PDCCH and larger frequency domain density p for the remaining $N_{rep}-1$ PDCCH repetitions in the next $N_{rep}-1$ PDCCH monitoring occasions.

The diagram 1300 as illustrated in FIG. 13 is an example of RE mapping for PDCCH DM-RS within an eREG.

As illustrated in FIG. 13, an eREG is made up of 1 RB over 2 OFDM symbols. The first symbol of the 2 OFDM symbols is used as physical resource for PDCCH DM-RS. The PDCCH DM-RS is mapped into a SC every 4 SCs in the first OFDM symbol with a SC offset of 1.

The diagram 1400 as illustrated in FIG. 14 is an example of RE mapping for PDCCH DM-RS for a PDCCH transmission with large SCS or for a PDCCH transmission with repetitions.

As illustrated in FIG. 14, a DCI format is provided by a PDCCH that a UE (such as the UE 116) receives with two PDCCH repetitions, 1401 and 1402, respectively. The PDCCH DM-RS is mapped into a SC every 2 SCs in the first OFDM symbol for each of the two PDCCH repetitions. A similar mapping can apply for a PDCCH transmission with large SCS, such as 480 kHz, where the DM-RS density in frequency can be as in FIG. 12 and be larger than a DM-RS density in frequency for small SCS, such as 30 kHz or 120 kHz, while the DM-RS can be included in some, such as only a first, or all symbols of a PDCCH transmission.

The diagram 1500 as illustrated in FIG. 15 is an example of RE mapping for PDCCH DM-RS for multiple PDCCH DM-RS structures.

As illustrated in FIG. 15, a search space set is configured with two PDCCH monitoring occasions, 1501 and 1502, respectively. A first PDCCH DM-RS structure occupies one of four subcarriers in every symbol from the symbols used for a PDCCH reception, 1503 and 1504. A second PDCCH DM-RS structure occupies one of four subcarriers for a first symbol from the symbols used for PDCCH reception, 1503. Therefore, the second PDCCH DM-RS structure uses a subset of the REs used by the first PDCCH DM-RS structure. The first PDCCH DM-RS structure can be used for a PDCCH reception without repetitions. The second PDCCH-DM-RS structure can be used for a PDCCH reception based on two PDCCH repetitions received in the two PDCCH monitoring occasions.

The method 1600 as illustrated in FIG. 16 is an example UE procedure for determining PDCCH DM-RS structure.

In step 1610, a UE (such as the UE 116) can be provided a configuration of a search space set for PDCCH receptions, and two PDCCH DM-RS structures. Alternatively, the DM-RS structures can be predetermined in the specification of the system operation. In step 1620, the UE determines a reception of a PDCCH candidate with N>=1 repetitions according to the search space set configuration. In step 1630 UE determines whether or not the repetition number is larger than one. If N>1 (as determined in step 1630), the UE in step 1640 receives the PDCCH candidate based on a second PDCCH DM-RS structure. Alternatively, if N=1, such as a case with no repetitions, (as determined in step 1630), the UE in step 1650 receives the PDCCH candidate based on a first PDCCH DM-RS structure.

Although FIG. 13 illustrates the diagram 1300, FIG. 14 illustrates the diagram 1400, FIG. 15 illustrates the diagram 1500, and FIG. 16 illustrates the method 1600 various changes may be made to FIGS. 13-16. For example, while the method 1600 is shown as a series of steps, various steps could overlap, occur in parallel, occur in a different order, or occur multiple times. In another example, steps may be omitted or replaced by other steps. For example, steps of the method 1600 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
a transceiver configured to receive first information for a number of N>1 search space sets, wherein, for each of the N search space sets, the first information includes:
an index, wherein search space sets are indexed in an ascending order of respective indexes,
a periodicity, wherein the periodicity is same for all of the N search space sets, and
an indication that the N search space sets are linked for receptions of physical downlink control channel (PDCCH) candidates, wherein:
a PDCCH candidate is received over a number of control channel elements (CCEs) corresponding to a CCE aggregation level, and
PDCCH candidates, for search space sets from the N search space sets, with same index and with same CCE aggregation level provide identical information; and
a processor operably coupled to the transceiver, the processor is configured to determine a number of N PDCCH reception occasions for N PDCCH candidates with same index and same CCE aggregation level, respectively, according to the first information, wherein a n-th PDCCH reception occasion from the N PDCCH reception occasions is according to a n-th search space set from the N search space sets ($1 \leq n \leq N$),
wherein the transceiver is further configured to receive N PDCCHs in the N PDCCH reception occasions.

2. The UE of claim 1, wherein:
the processor is further configured to determine a resource for transmission of a physical uplink control channel (PUCCH) with hybrid automatic repeat request acknowledgement (HARQ-ACK) information based on a first control channel element (CCE) of a PDCCH from the N PDCCHs,
the PDCCH is received in a first PDCCH reception occasion from the N PDCCH reception occasions, and
the N PDCCH reception occasions are indexed in an ascending order of corresponding search space sets.

3. The UE of claim 1, wherein the processor is further configured to determine:
a PDCCH from the N PDCCHs, wherein:
the PDCCH is received in a first PDCCH reception occasion from the N PDCCH reception occasions in a slot, and the N PDCCH reception occasions are indexed in an ascending order of their respective start times, and
a Type-2 HARQ-ACK codebook based on the PDCCH.

4. The UE of claim 1, wherein:
the processor is further configured to determine a PDCCH from the N PDCCHs,
the PDCCH is received in a last PDCCH reception occasion from the N PDCCH reception occasions,
the N PDCCH reception occasions are indexed in an ascending order of their respective start times, and
the identical information provided by the PDCCHs includes a slot offset between a start of the PDCCH reception and one of:
a reception of a physical downlink shared channel (PDSCH) or of a channel state information reference signal (CSI-RS), or
a transmission of a physical uplink shared channel (PUSCH).

5. The UE of claim 1, wherein:
the first information includes N bitmaps corresponding to the N search space sets,
each bitmap from the N bitmaps indicates whether or not to receive PDCCHs in slots within a group of X>1 slots, and
the N bitmaps have same values.

6. The UE of claim 1, wherein:
the processor is further configured to determine a number of PDCCH receptions,
the number of PDCCH receptions is smaller than a maximum number of PDCCH receptions, and
the N PDCCH receptions are counted as one PDCCH reception.

7. The UE of claim 1, wherein:
the transceiver is further configured to receive second information for a number of L search space sets;
the processor is further configured to determine a first demodulation reference signal (DM-RS) structure and a second DM-RS structure; and
the transceiver is further configured to receive:
any PDCCH according to any search space set from the L search space sets according to the first DM-RS structure, and
any PDCCH according to any search space set from the N search space sets according to the second DM-RS structure.

8. A base station (BS) comprising:
a transceiver configured to transmit first information for a number of N>1 search space sets, wherein, for each of the N search space sets, the first information includes:
an index, wherein search space sets are indexed in an ascending order of respective indexes,
a periodicity, wherein the periodicity is same for all of the N search space sets, and
an indication that the N search space sets are linked for transmissions of physical downlink control channel (PDCCH) candidates, wherein:
a PDCCH candidate is received over a number of control channel elements (CCEs) corresponding to a CCE aggregation level, and
PDCCH candidates, for search space sets from the N search space sets, with same index and with same CCE aggregation level provide identical information; and
a processor operably coupled to the transceiver, the processor is configured to determine a number of N PDCCH transmission occasions for N PDCCH candidates with same index and with same CCE aggregation level, respectively, according to the first information, wherein a n-th PDCCH transmission occasion from the N PDCCH transmission occasions is according to a n-th search space set from the N search space sets, wherein the transceiver is further configured to transmit N PDCCHs in the N PDCCH transmission occasions.

9. The BS of claim 8, wherein:
the processor is further configured to determine a resource for reception of a physical uplink control channel (PUCCH) with hybrid automatic repeat request acknowledgement (HARQ-ACK) information based on a first control channel element (CCE) of a PDCCH from the N PDCCHs,
the PDCCH is transmitted in a first PDCCH transmission occasion from the N PDCCH transmission occasions, and
the N PDCCH transmission occasions are indexed in an ascending order of corresponding search space sets.

10. The BS of claim 8, wherein:
the transceiver is further configured to receive a PUCCH or a physical uplink shared channel (PUSCH) that provides a Type-2 HARQ-ACK codebook,
the processor is further configured to determine a PDCCH from the N PDCCHs,
the PDCCH is transmitted in a first PDCCH transmission occasion from the N PDCCH transmission occasions,
the N PDCCH transmission occasions are indexed in an ascending order of their respective start times, and
the Type-2 HARQ-ACK codebook is based on the PDCCH.

11. The BS of claim 8, wherein:
the processor is further configured to determine a PDCCH from the N PDCCHs,
the PDCCH is transmitted in a last PDCCH transmission occasion from the N PDCCH transmission occasions, and
the N PDCCH transmission occasions are indexed in an ascending order of their respective start times, and
the identical information includes a slot offset between a start of the PDCCH transmission and one of:
a transmission of a physical downlink shared channel (PDSCH) or of a channel state information reference signal (CSI-RS), or
a reception of a physical uplink shared channel (PUSCH).

12. The BS of claim 8, wherein:
the first information includes N bitmaps corresponding to the N search space sets,
each bitmap from the N bitmaps indicates whether or not to transmit PDCCHs in slots within a group of X>1 slots, and
the N bitmaps have same values.

13. The BS of claim 8, wherein:
the transceiver is further configured to transmit second information for a number of L search space sets;
the processor is further configured to determine a first demodulation reference signal (DM-RS) structure and a second DM-RS structure; and
the transceiver is further configured to transmit:
any PDCCH according to any search space set from the L search space sets according to the first DM-RS structure, and
any PDCCH according to any search space set from the N search space sets according to the second DM-RS structure.

14. A method comprising:
receiving first information for a number of N>1 search space sets, wherein, for each of the N search space sets, the first information includes:
an index, wherein search space sets are indexed in an ascending order of respective indexes,
a periodicity, wherein the periodicity is same for all of the N search space sets, and
an indication that the N search space sets are linked for receptions of physical downlink control channel (PDCCH) candidates, wherein;
a PDCCH candidate is received over a number of control channel elements (CCEs) corresponding to a CCE aggregation level, and
PDCCH candidates, for search space sets from the N search space sets, with same index and with same CCE aggregation level provide identical information;
determining a number of N PDCCH reception occasions for N PDDCH candidates with same index and same CCE aggregation level, respectively, according to the first information, wherein a n-th PDCCH reception occasion from the N PDCCH reception occasions is according to a n-th search space set from the N search space sets; and
receiving N PDCCHs in the N PDCCH reception occasions.

15. The method of claim 14, further comprising
determining a resource for transmission of a physical uplink control channel (PUCCH) with hybrid automatic repeat request acknowledgement (HARQ-ACK) information based on a first control channel element (CCE) of a PDCCH from the N PDCCHs, wherein:
the PDCCH is received in a first PDCCH reception occasion from the N PDCCH reception occasions, and
the N PDCCH reception occasions are indexed in an ascending order of corresponding search space sets.

16. The method of claim 14, further comprising determining:
a PDCCH from the N PDCCHs, wherein:
the PDCCH is received in a first PDCCH reception occasion from the N PDCCH reception occasions, and
the N PDCCH reception occasions are indexed in an ascending order of their respective start times, and
a Type-2 HARQ-ACK codebook based on the PDCCH.

17. The method of claim 14, further comprising determining a PDCCH from the N PDCCHs, wherein:
the PDCCH is received in a last PDCCH reception occasion from the N PDCCH reception occasions,
the N PDCCH reception occasions are indexed in an ascending order of their respective start times, and
the identical information includes a slot offset between a start of the PDCCH reception and one of:
a reception of a physical downlink shared channel (PDSCH) or of a channel state information reference signal (CSI-RS), or
a transmission of a physical uplink shared channel (PUSCH).

18. The method of claim 14, wherein:
the first information includes N bitmaps corresponding to the N search space sets,
each bitmap from the N bitmaps indicates whether or not to transmit PDCCHs in slots within a group of X>1 slots, and
the N bitmaps have same values.

19. The method of claim 14, further comprising determining a number of PDCCH receptions, wherein:
- the number of PDCCH receptions is smaller than a maximum number of PDCCH receptions, and
- the N PDCCH receptions are counted as one PDCCH reception.

20. The method of claim 14, further comprising:
- receiving second information for a number of L search space sets;
- determining a first demodulation reference signal (DM-RS) structure and a second DM-RS structure; and
- receiving:
  - any PDCCH according to any search space set from the L search space sets according to the first DM-RS structure, and
  - any PDCCH according to any search space set from the N search space sets according to the second DM-RS structure.

\* \* \* \* \*